(12) United States Patent
Skarulis

(10) Patent No.: US 8,963,957 B2
(45) Date of Patent: Feb. 24, 2015

(54) SYSTEMS AND METHODS FOR AN AUGMENTED REALITY PLATFORM

(76) Inventor: Mark Skarulis, Redondo Beach, CA (US)

( * ) Notice: Subject to any disclaimer, the term of this patent is extended or adjusted under 35 U.S.C. 154(b) by 370 days.

(21) Appl. No.: 13/549,081

(22) Filed: Jul. 13, 2012

(65) Prior Publication Data

US 2013/0016123 A1    Jan. 17, 2013

Related U.S. Application Data

(60) Provisional application No. 61/508,500, filed on Jul. 15, 2011.

(51) Int. Cl.
G09G 5/00 (2006.01)
(52) U.S. Cl.
CPC ........................................ G09G 5/00 (2013.01)
USPC .......................................................... 345/633
(58) Field of Classification Search
None
See application file for complete search history.

(56) References Cited

U.S. PATENT DOCUMENTS

| | | | | |
|---|---|---|---|---|
| 7,053,915 B1 * | 5/2006 | Jung et al. | ...................... | 345/633 |
| 7,898,504 B2 * | 3/2011 | Fischer | ............................. | 345/9 |
| 8,264,504 B2 * | 9/2012 | Naimark | ........................ | 345/629 |
| 8,275,590 B2 * | 9/2012 | Szymczyk et al. | ................. | 703/6 |
| 8,514,250 B2 * | 8/2013 | Naimer et al. | ................. | 345/632 |
| 8,547,401 B2 * | 10/2013 | Mallinson et al. | ............. | 345/633 |
| 8,682,879 B2 * | 3/2014 | Kim et al. | ...................... | 707/706 |
| 2009/0256860 A1 * | 10/2009 | Nichols | .......................... | 345/632 |

OTHER PUBLICATIONS

Azavea et al., "Augmented Reality by PhillyHistory.org," 2011, City of Philadelphia Department of Records and Azavea, White Paper, 26 pages.

* cited by examiner

*Primary Examiner* — Ryan R Yang
(74) *Attorney, Agent, or Firm* — Procopio, Cory, Hargreaves & Savitch LLP

(57) ABSTRACT

Systems and methods for augmenting a view of reality. In an embodiment, a first medium is superimposed over a first view of reality. One or more changes to the superimposed medium are received, such as a change in transparency, change in size, and change in position. A first marker, comprising at least a portion of the first view of reality, is generated. First metadata related to the first medium and/or the first marker are also generated. The first medium, the first marker, and the first metadata are sent to a depository. In a further embodiment, a second medium, second marker, and second metadata are received from the depository. The second marker is matched to a least a portion of a second view of reality, and the second medium is superimposed over the at least a portion of the second view of reality to generate an augmented view of reality.

18 Claims, 15 Drawing Sheets

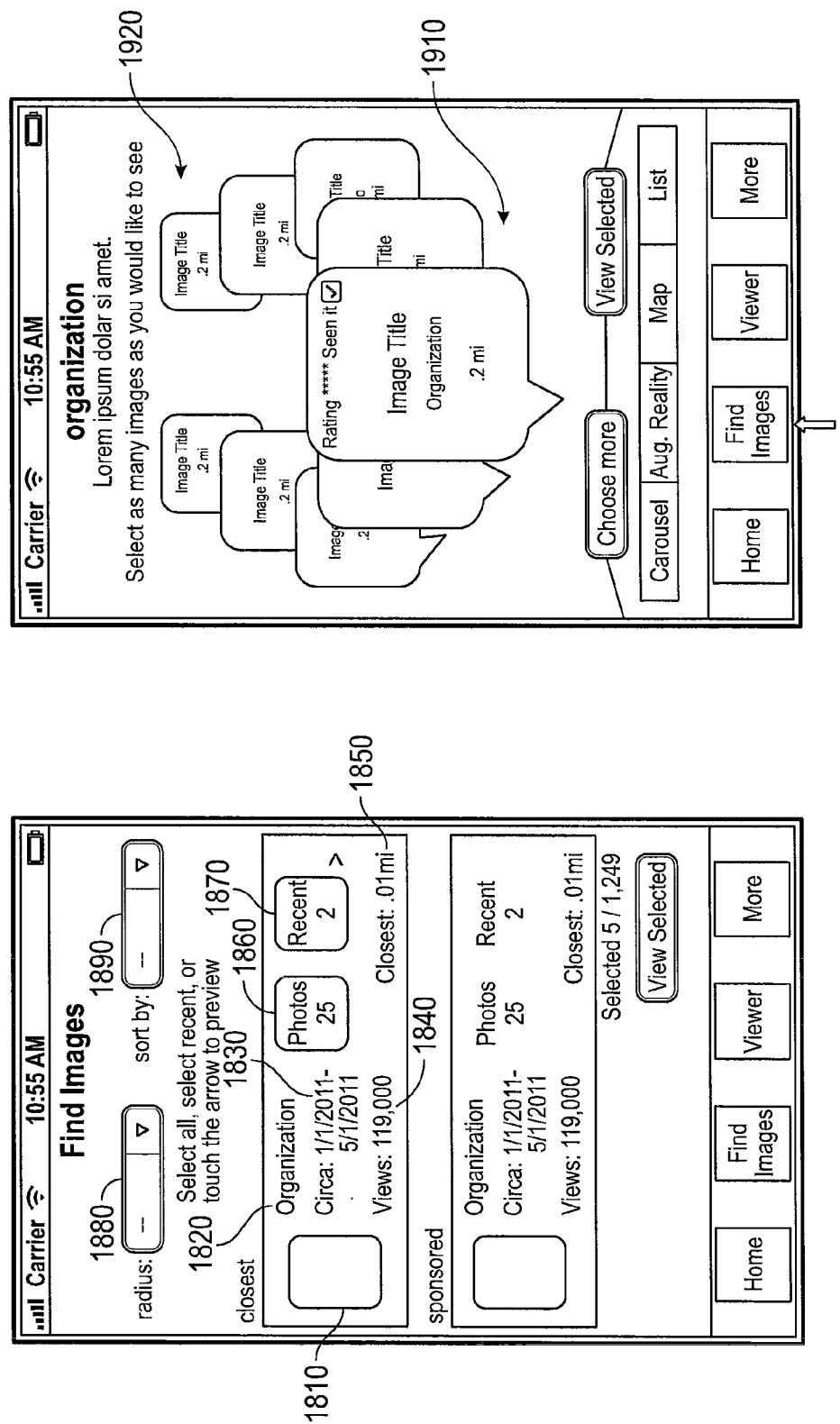

SYSTEMS AND METHODS FOR AN AUGMENTED REALITY PLATFORM

PRIORITY

This application claims priority to U.S. Provisional Patent App. No. 61/508,500, filed on Jul. 15, 2011, and titled "Systems and Methods for an Augmented Reality Platform," the entirety of which is hereby incorporated herein by reference.

FIELD OF THE INVENTION

This application relates to an augmented reality platform utilized for storage, retrieval and viewing of geo-located media related to a view of reality.

BACKGROUND

Augmented Reality generally refers to altering a view of reality. Artificial information about a real environment can be overlaid over a view of the real environment. The artificial information can be interactive or otherwise manipulable, providing the user of such information with an altered, and often enhanced, perception of reality. However, Augmented Reality is still a relatively new area of interest with limited present-day applications. For instance, the first-down line often seen in television broadcasts of American football games is one example of a limited application of Augmented Reality.

The iPhone®, iPad®, more recent Android-platform smart phones, and Android tablets offer an array of technologies not seen before in mobile handheld devices. The high bandwidth connections, Global Positioning Systems (GPS), and high-speed processors and positional sensors offer new opportunities in the field of Augmented Reality.

SUMMARY

As disclosed herein, this technology can be leveraged into a more immersive and communal experience of Augmented Reality on a smart phone platform. Imagine a virtual gallery where photos, history, and futuristic designs are viewable from the original artist's vantage point, fixed in free space, while superimposed over reality. Further imagine that this virtual gallery can be created and shared by friends, family, or any other social group. Imagine being able to take a picture or video of yourself or your friends interacting with the virtual gallery. The result is a unique social experience of the world, where the notion of feeling like you were there will be supplanted by actually being there.

The unseen, the unnoticed and the unimaginable will be available simply by linking with new friends or social groups and accessing their virtual galleries. Old discarded photos may receive new life by being incorporated into an interactively augmented version of reality. Social groups can strengthen their connections by experiencing the past, present, and future in the same manner. Normal experiences, such a walking or sight-seeing, can be augmented and enhanced at every turn, rendering daily routines into something amazing and communal, and intimately connecting individuals with their surroundings as seen through multiple eyes and over numerous time periods. Indeed, users experiencing their surroundings, augmented by past or future media, may experience something akin to time travel. These experiences and more can be enabled and realized by one or more embodiments of the Augmented Reality Platform disclosed herein.

In one embodiment, a system for generating an augmented reality is provided. The system comprises a virtual map module configured to receive a medium, receive a marker associated with the medium, receive metadata related to at least one of the medium and the marker, and store the medium, the marker, and the metadata in the at least one memory. In an embodiment, the marker may represent at least a portion of a view of reality which is related to the medium. The virtual map module may be further configured to receive a request for the medium, retrieve the medium, the marker, and the metadata from the at least one memory in response to the request for the medium, and send the medium, the marker, and the metadata in response to the request for the medium.

In a further embodiment, the medium, the marker, and the metadata are received by a client device in communication with the virtual map module. A current camera view of the client device can then be compared to the marker. When a match between the marker and the current camera view is confirmed, the current camera view can then serve as the marker for purposes of superimposing the medium. In other words, the marker received from the virtual map module is switched for the current camera view. Accordingly, the current camera view, instead of the received marker, is used for superimposition of the medium.

In an embodiment, a system for generating an augmented view of reality is provided. The system comprises a client perspective module stored on a client device which is configured to superimpose a first medium over a first view of reality, receive one or more of a change in transparency of the superimposed first medium, a change in size of the superimposed first medium, and a change in position of the superimposed first medium, generate a first marker, generate first metadata related to at least one of the first medium and the first marker, and send the first medium, the first marker and the first metadata to a depository. In an embodiment, the first marker comprises at least a portion of the first view of reality. The system may also comprise a client viewer module stored on the client device which is configured to retrieve a second medium, a second marker and second metadata from the depository, match the second marker to at least a portion of the second view of reality, and superimpose the second medium over the at least a portion of the second view of reality to generate an augmented view of reality.

In a further embodiment, a method for generating an augmented view of reality is provided. The method comprises receiving a medium, receiving a marker associated with the medium, receiving metadata related to at least one of the medium and the marker, and storing the medium. In an embodiment, the marker is a representation of at least a portion of a view of reality which is related to the medium. The method may further comprise receiving a request for the medium, retrieving the medium, the marker, and the metadata from the at least one memory in response to the request for the medium, and sending the medium, the marker and the metadata in response to the request for the medium.

In an additional embodiment, a method for generating an augmented view of reality is provided. The method comprises superimposing a medium over a view of reality, receiving one or more of a change in transparency of the superimposed medium, a change in size of the superimposed medium, and a change in position of the superimposed medium, generating a marker, generating metadata related to at least one of the medium and the marker, and sending the medium, the marker and the metadata to a depository. In an embodiment, the marker comprises at least a portion of the view of reality.

In another embodiment, a method for generating an augmented view of reality is provided. The method comprises receiving a medium, a marker and metadata from a depository, matching the marker to at least a portion of a view of reality, and superimposing the medium over the matched at least a portion of the view of reality to generate an augmented view of reality. In an embodiment, the marker comprises at least a portion of the view of reality.

BRIEF DESCRIPTION OF THE DRAWINGS

The details of one or more embodiments of the present invention, both as to structure and operation, may be gleaned in part by study of the accompanying drawings, in which like reference numerals refer to like parts, and in which:

FIG. 18 illustrates a display for listing media available for viewing, according to an embodiment;

FIG. 19 illustrates a carousel display for listing media available for viewing, according to an embodiment;

DETAILED DESCRIPTION

Figure 2:
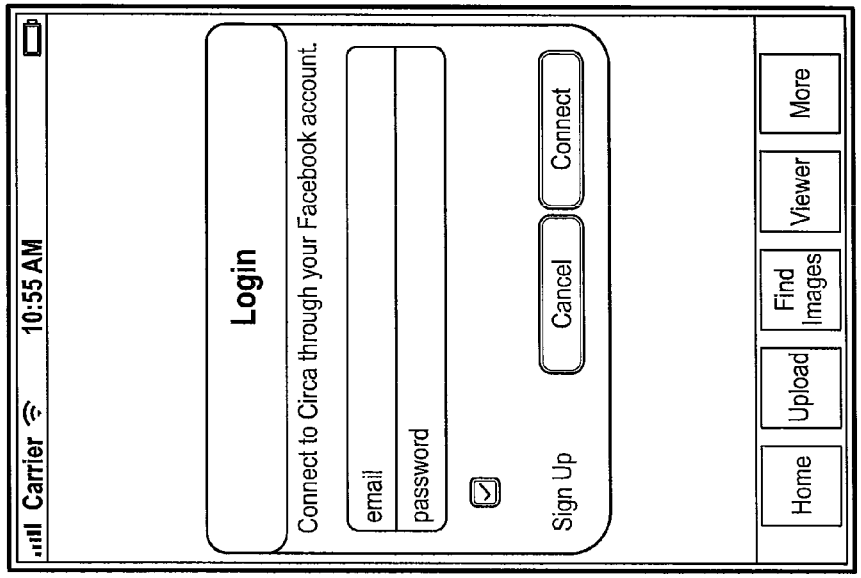
FIG. 2 illustrates a display for obtaining authentication information from a user of a client device, according to an embodiment.

Systems and methods for generating an augmented reality using an Augmented Reality Platform are provided. After reading this description, it will become apparent to one skilled in the art how to implement the invention in various alternative embodiments and alternative applications. Although various embodiments of the present invention are described herein, it is understood that these embodiments are presented by way of example only, and not limitation. As such, this description of various alternative embodiments should not be construed to limit the scope or breadth of the present invention. Furthermore, unless otherwise specified, when references are made herein to an action or step being performed, the steps are performed by the Augmented Reality Platform implemented on a client device or server.

1. Virtual Map

The Virtual Map (VM) is a depository for the media which makes up the virtual world. In an embodiment, this media may include any type of image (e.g., photographs, illustrations, designs, icons, and the like), video recordings, three-dimensional models, animations, audio recordings, narratives and other descriptions, including words and statistics, links to websites, Really Simply Syndication (RSS) feeds, and any other type of information that can be related to an environment. Alternatively, the media stored in the VM can be limited to certain types of information, such as images only, videos only, images and videos only, etc. The VM can also act as a depository for user information and customer-related data (e.g., authentication information, including usernames and passwords, and other types of account information, such as contact information and the like).

The VM may comprise one or more databases in which the media is stored. Information related to the media (i.e., metadata), as well as user information and customer-related data, may also be stored in the database(s) or in a separate database or databases. In an embodiment, the databases are relational databases and retrieval is performed using Structured Query Language (SQL). In response to retrieval requests, the VM can query the database(s) to retrieve and return media, metadata, user and/or customer information, and/or other information stored in the database(s). In response to save requests, the VM can save or modify the media, metadata, user and/or customer information, and/or other information in the database(s).

In an embodiment, the VM resides on a server or multiple servers within a network. The server or servers may be accessible via one or more networks, which may include the Internet. The VM may implement an application programming interface (API). In one embodiment, the API is an Extensible Markup Language (XML) API. In this embodiment, requests to the VM and responses from the VM are packaged in XML. In an embodiment, sensor data and other information associated with the media can be, partially or wholly, packaged or encoded with the associated medium, for example, in an Exchangeable Image File Format (EXIFF) file. A person having ordinary skill in the art will appreciate that there are a myriad of suitable APIs and communication formats available.

In an embodiment, access to the VM may be restricted. For instance, authentication may be required before the VM will respond to a request. In addition, one or more permissions may be associated with a user of the VM. For instance, a user may be restricted to receiving only media which was generated by members of a social group of which the user is also a member. The VM may operate in conjunction with or in a similar manner as a social networking application, such as Facebook®. In such an embodiment, an originator—or architect—of a medium may associate the medium with permissions. These permissions may be stored in metadata associated with the medium, for example, in one or more databases. The permissions may restrict access of the medium to specific users or groups of users. Certain permission(s) or the absence of permissions may allow public access to the medium.

According to an embodiment, when the originator of a medium uploads or otherwise saves or modifies the medium, a notice can be sent or posted. For example, a notice can be posted to a website or other application associated with the originator, such as a Facebook® Wall. In addition, a notice can be posted on a website or other application associated with one or more members of a social group of which the originator is a member or with which the originator is associated. For example, the notice may be posted to profiles of users which have permission to view media associated with the originator. In addition or alternatively, a notice, such as an email, text message, application message, or the like, can be sent to members of the social group or to permitted users. The notice may be sent to a mobile device of the members and/or permitted users.

The notice may comprise information related to the medium. For example, the notice may comprise a link which enables display of the medium as an augmentation of reality. The notice may comprise an identity of the originator of the medium. In an embodiment, the notice may comprise a location where the medium was created. The notice may also comprise a description of the medium or a comment related to the medium. The notice may further include information, such as directions or a hyperlink, which enables viewers of the notice to download a client application associated with the Augmented Reality Platform.

2. Client Application

The client application enables creation or saving of media for viewing by users of the Augmented Reality Platform, and/or the viewing of the media as an augmentation of reality. These functions may be embodied in a single client application. Alternatively, the functions can be performed by separate client applications, such as a client perspective application and a client viewer application. While a client perspective module and client viewer module are separately referred to herein, a person having ordinary skill in the art will appreciate that these modules may be implemented as a single module or separate modules, and may be implemented in a single client application or as separate client applications.

The client application(s) may reside on a client device, such as a smart phone, tablet device, or other device which includes or is in communication with one or more cameras or optical viewers. The client application is in communication with the VM (e.g., over one or more networks, such as the Internet) and implements the API of the VM. In an embodiment, the API is an XML API, and the client application packages requests and receives responses in XML format. However, a person having ordinary skill in the art will appreciate that there are a myriad of suitable APIs and communication formats available.

a. Client Perspective Module

In an embodiment, a client perspective module of the client application(s) is configured to receive information from sensors embedded or otherwise connected to the client device. In an embodiment, the sensors include a GPS, an accelerometer, and/or a compass. The sensor(s) permit the client perspective module to obtain data related to the location and orientation of the client device. In an embodiment, this data includes the geographical location (geo-location), yaw, pitch, and roll of the client device. This data may also include a time of day and/or existing lighting conditions. Geo-location data can comprise the latitude, longitude and/or elevation of the client device. In addition or alternatively, the geo-location data may comprise a street address or other address associated with the location of the client device. A person having ordinary skill in the art will appreciate that other sensors can be utilized and/or other information can be collected and helpful in determining the location and orientation of a client device.

The client perspective module is configured to receive an image and/or video from a camera or other optical viewer. A user of the client perspective module may generate an image, video, or other medium by positioning the client device such that a desired image of reality is visible in the optical viewer, and then indicating that the client device should capture the medium, e.g., by pressing a physical or virtual (e.g., touchscreen) action button. The client perspective module can capture the medium along with information from the sensor(s) regarding the location and orientation of the device at the time the medium was captured. In this embodiment, the captured medium is also a marker which can be used by the client viewer module for pattern-matching. The client perspective module can also capture the time of day and/or existing lighting conditions at the time that the marker is captured.

In an embodiment, the client perspective module is configured to enable the user of the client device to "pin" previously created media, such as an image, video, or other medium, to a view of reality. For example, the user of the client device can obtain a digitization of a historical photograph or other historical medium and store the digital image in a memory on the client device. The user may then return to the location where the photograph was originally taken and utilize the client application to match the photograph to reality.

In at least some of the embodiments disclosed herein, an individual is able to give new life to, for example, a historical photograph. The user may, first, need to digitize the photograph, e.g., by scanning the image into a digital file using a digital scanner. Next, the user can physically transport the digital file (e.g., on a smart phone or other digital device) to the location where the historical photograph was taken. The user can then "pin" the digitized photograph onto the real world (e.g., using the client perspective module). Essentially, the historical photograph is hung up, like a poster, in the real world. While the photograph is "hung" in a digital form, the digitized photograph is not bound to a purely digital world.

Rather, friends, family, social groups, etc., can experience and interact with the subject matter of the digitized historical photograph in the real world (e.g., using the client viewer module). In this manner, the digital world and the real world are merged into an augmented reality.

According to one embodiment, the client perspective module can superimpose the medium (e.g., image such as a photograph) over a view of reality visible in the optical viewer of the client device. The client perspective module can apply a transparency to the medium. The level of transparency (e.g., percentage of transparency) applied to the medium can be a predetermined application setting, or a user setting with or without a predetermined default value. In embodiments in which the transparency is a user setting, the client perspective module may overlay a slider bar over the view of reality. The user may then interact with the slider bar (e.g., by moving a selector from one end of the slider bar to the other end of the slider bar) to easily adjust the transparency of the medium from one end of a spectrum (e.g., 100%, 99%, 98%, etc. transparent) to the other end of the spectrum (e.g., 100%, 99%, 98%, etc. opaque).

The user can adjust the scale of the medium while it is superimposed over the view of reality in order to match the natural scale of the view of reality. For example, in embodiments which utilize a touch-screen interface, the scale of the medium may be adjusted using "pinch" and "spread" interactions. For example, the user can place two fingers (e.g., index finger and thumb) on the medium, and pinch the fingers together to reduce the size of the medium or spread the fingers apart to increase the size of the medium. The user can also orient the client device and/or move the medium so as to align the superimposed medium with the view of reality in the optical viewer. For example, in embodiments which utilize a touch-screen interface, the user may touch and drag the medium around a display of the view of reality in order to align the medium with the view of reality. In these manners, the client perspective module may be configured to enable the user to adjust the superimposed medium, such as by resizing the medium, rotating the medium in two or three dimensions, or otherwise adjusting the medium within the optical viewer. This ability creates a methodology for manual inverse photogrammetry, which is the discovery of the original location for the content of a medium through superimposition of the medium on reality. Additionally or alternatively, the client perspective module can be configured to at least attempt to automatically align the superimposed medium, for example, by resizing or rotating the medium to match a pattern or patterns in the medium to a pattern or patterns in the view of reality.

A medium is aligned with the view of reality when features of the medium (e.g., landmarks and/or other distinguishing features) are geometrically congruent with corresponding features of the view of reality. When the photograph or other medium is in alignment or near alignment with the view of reality, the augmented view can be captured either automatically or in response to a user interaction, such as a selection of a physical or virtual action button. The client perspective module captures the view of reality or a portion of the view of reality and the superimposed medium's relationship with the view of reality in the optical viewer at the time of capture, i.e., the manner in which the user or client perspective module has aligned the medium with the captured view of reality. In this embodiment, the captured view of reality or portion of view of reality is the marker which can be used by the client viewer module for pattern-matching. The client perspective module can also capture information regarding orientation of the client device from the sensors. Location information, such as latitude and longitude or address, can also be captured from the sensors, or alternatively, input by the user of the client device. In an embodiment, the medium may already have associated location and/or orientation information. Other information may be input by the user, such as date, time, title, description, comment, hyperlink, information related to the user of the client device, etc.

Both the captured view of reality and the medium (e.g., historical photograph), either separately or overlaid/merged, may be encapsulated or referenced in an embeddable algorithm or code (e.g., HTML code) that can be shared via networks, such as the Internet and/or wireless networks for mobile communications on mobile devices and Internet-connected devices. For example, this embeddable code can be plugged into a HTML-based webpage or into a software application. The embeddable code may allow users to see an individual image or morphed image of the captured view of reality and medium in memory, as well as adjust the transparency via a manual slide or other interactive input, and view the progression from the view of reality to the morphed image. The code may be written in versatile and flexible multi-platform or cross-platform code (e.g., Java, JavaScript, Flash, etc.) that can be easily shared and/or embedded. In an embodiment, the code aligns the medium with the captured view of reality for presentation on a plurality of devices and across one or more networks, including the Internet and/or one or more wireless networks.

In an embodiment, once a medium has been pinned using the client perspective module, both the captured view of reality and the medium are encapsulated into an embeddable algorithm that can be shared by means of the Internet, wireless networks for mobile communications, and/or other networks. The embeddable algorithm may utilize a plug-in, and layers the medium and the captured view of reality. The algorithm also applies image filters that can be adjusted by the user to create a composite "then and now" image. For maximum compatibility with mobile and network devices, the algorithm or plug-in can be written using platform-independent and operating system-independent languages and/or technologies (e.g., Java).

It should be understood that the medium being pinned need not necessarily be historical or previously created. For instance, the user of the client perspective module may generate the medium simultaneously with the marker. In some cases, the medium may itself be the marker or the basis for the marker. For example, a user could use the client perspective module to capture a photograph of street art painted on an external wall of a building. The client perspective module can generate a marker from the captured photograph or geometric features of the captured photograph. In this case, the medium is generated simultaneously or contemporaneously with the marker. Subsequently, a client viewer module can use the marker and/or orientation information to align the medium and, for example, display the street art to a user via a client device, even after the street art has been painted over or otherwise obscured or destroyed.

According to an embodiment, the view of reality is captured by an infrared or near infrared (IR) receiver. The IR receiver may be embedded or otherwise in communication with the client device. In this embodiment, the marker may comprise an encoded thermal image of the view of reality. This thermal image marker, which may exist in the non-discernable IR spectrum, enables recognition of the marker, and thus alignment and viewing of the medium, in both daylight and nighttime settings. Such a thermal image marker may be non-discernable in that it would not typically be noticed or viewable by the naked eye in reality and may not itself be useful or enjoyable as an image. Thus, in an embodiment, the marker may have no use outside the system. Rather, the marker acts as a trigger for the system. For example, the marker may act as a pattern which is recognized by, and triggers a response (e.g., superimposition and alignment of a medium to a view of reality) from, the client viewer module. In this manner, the client perspective module is able to utilize and appropriate reality's schemes, visual cues, designs, lighting, and other visual information for the purposes of the system (e.g., client viewer module).

In addition to this infrared or near infrared marker, the client perspective module can detect and generate point clouds of physical surroundings. The point clouds may comprise a plurality of three-dimensional points representing one or more objects in the view of reality. Each point may comprise x, y, and z coordinates, and an associated color. The coordinates may be relative to the position of the client device, relative to the earth (e.g., by translating the coordinates relative to the client device into GPS coordinates based on the client device's GPS location), or relative to some other baseline. The point clouds can be stored as metadata with the marker, and can be used by the client viewer module to orientate the marker and reveal the medium when the point cloud is matched to a formation of physical surroundings. The software for generating the point clouds by the client perspective module and matching the point clouds to physical surroundings by the client viewer module can be an add-in, for example, that is sold as an upgrade or additional feature of the respective modules.

According to an embodiment, after the marker is captured, the client perspective module may request information from the user, for instance, by displaying inputs with which the user can interact. For example, the client perspective module may display input text boxes, into which a user can enter information, such as date, time, title, description, comment, hyperlink, and/or information related to the user of the client device. The client perspective module may also display a map on which the user can indicate a location to be associated with the medium, for example, by tapping on a location on the map.

The marker and the medium can be packaged into a save request by the client perspective module, which is then forwarded by the client perspective module to the VM for storage and future retrieval and viewing. In the embodiment or scenario where the marker is the medium (e.g., the view of reality is captured as the medium to be hung), the save request can include two copies of the medium, one designated as the marker and the other designated as the medium, or it may include only one copy of the medium. Relationship information between the marker and medium can also be packaged into the save request. For example, the relationship information may include dimensions, offsets, and/or angles of rotation of the medium, which are required to align the medium with the marker. In addition, captured sensor data may also be packaged into the save request. Other information may be packaged into the save request as well, such as a date, time, title, address, description, comment, hyperlink, information related to the user of the client device, etc. In an embodiment, the sensor data, relationship information, and other information can be, partially or wholly, packaged or encoded with the marker and/or medium, for example, in an EXIFF file.

In an embodiment, the media and associated metadata and other information can be subsequently edited or added to by the originators and/or other users with access to the media. For example, an originating user may want to update a description of the medium, or a non-originating user may want to add a comment about or rating of the medium. In either case, the updated or additional information can be packaged into a modification or save request and forwarded to the VM for storage.

In an embodiment, the marker is more than simply an image of the view of reality. The marker represents a calculated vector from the client device, whereas the image is the visual representation of the calculated vector. The vector may comprise yaw, pitch, roll, altitude, directional information, and the like. This enables the client perspective module to capture reality at different vectors and allows the system (e.g., the client viewer module) to create "effects," or user experiences, utilizing a plurality of neighboring vectors. As the number of vectors grow and develop over time, a connected web of data and images can be utilized to create a fixed, augmented world from multiple views, comprising a multitude of desired media or effects.

In the disclosed embodiments, a client device, such as a mobile or handheld device, becomes a tool for building an augmented world with a myriad of effects. Such devices enable users to create and fix augmented-reality media or effects to locations and positions in the real world. In this manner, the augmented reality is built and positioned in the field, rather than in a lab. Generation of augmented-reality effects in the field and on location permits the calculation of more accurate vectors than would be possible in the lab. The effects are then fixed in location and position for subsequent viewing, for example, by any user utilizing a client viewer module.

According to an embodiment, once a user of the client perspective module has generated a marker corresponding to a certain location and position, the user may generate additional media/effects defined by vector positions which are relative to the generated marker. In this manner, multiple media/effects may be associated with a single marker.

The continual addition of vector information to the system allows the system to become more accurate, and specific algorithms can be implemented to reinforce the augmented reality. For example, an algorithm can be used to establish a baseline of positional information from the precision of the client device. If the client device capturing the marker is accurately tuned to the true global and local position in three-dimensional space, the marker can confirm any future users' relative position to the original pin-pointed position. Thus, the future users' sensor data can be calibrated to reflect the sensor data that would be generated by the client device which captured the marker. This calibration establishes a baseline and known delta for a specific user, region, local area, or device. In a similar manner, a specific object having a fixed and known true position can be utilized for calibration of a user's device. In this way, each client device can calibrate itself, enabling the devices to more accurately position an added augmented reality effect at its true position within a visual horizon.

In an embodiment, a three-dimensional marker can be generated. In this embodiment, a 360° panorama of a horizon or an omni-directional image can serve as the three-dimensional marker. It should be understood that the three-dimensional marker need not be a full 360° view, but may instead comprise some lesser degree, such as 90°, 180°, 270°, etc. The medium to be pinned can be divided up based on orientation and marker limitation to recreate a specific effect when the view is confirmed against (e.g., pattern-matched to) the three-dimensional marker. The three-dimensional marker can be generated (e.g., by the client perspective module) and matched (e.g., by the client viewer module), for instance, by aligning the view of reality of the client device to an initial direction and then rotating the client device with the optical viewer positioned outwardly to capture a panoramic (e.g., 360°) view of the environment. This omni-directional view can be captured by the client device and used to either generate the three-dimensional marker or match to a previously generated three-dimensional marker.

In an embodiment, omni-directional cameras and high-density photography (e.g., at or approaching giga-pixel levels) can be utilized to create a unique and highly detailed image from a singular point of view. The electronic representation of this image, at full resolution, may represent a range that is matched only by film and telescopic techniques. This image can serve as the outermost perimeter or baseline that is stored in the VM, and can be electronically degraded to recreate lower-resolution lens systems in client devices. Thus, a lower resolution view can be generated through computation, and the radial vector can be created from the higher, native resolution system that serves as a marker for the lower-resolution client device. Utilizing this method, the relative position between the initial stationary omni-directional high-density image, three-dimensional model, or animation and the client device can be approximated through inverse photogrammetry and/or visual algorithms which compare a current view of reality with the high-resolution omni-directional marker stored in the VM. This enables the user to walk through a virtual model in an augmented reality setting.

In an embodiment, a three-dimensional medium can be pinned to a view of reality. For example, a user can select a three-dimensional medium (e.g., three-dimensional image). The user can then position the three-dimensional medium in the view of reality using the client perspective module. The user could then rotate the client device with the optical viewer facing inward to capture a three-dimensional view of reality and generate a three-dimensional marker using the client perspective module.

In an embodiment, once a marker has been generated, the pinned medium and any digital effects can be switched out by users at will, and even for an indefinite amount of time. Utilizing the generated marker as the parent file, associated effects can be updated, changed, and recreated as the user sees fit. These modifications may be performed at any later date, for example, by accessing a user profile and updating the content for the specific marker file.

b. Client Viewer Module

In an embodiment, a client viewer module is configured to allow users of the Augmented Reality Platform to view media as an augmentation of reality. The client viewer module may require a user to log in to an account associated with the Augmented Reality Platform or a third-party service provider, such as Facebook®. The login may require authentication of the user, for example, by requiring the user to enter a username or email address and a password associated with the username or email address. Following authentication, the client viewer module may then access the VM. In an alternative embodiment, no account or authentication is required.

In an embodiment, the user of the client device can search for media available for viewing. Search fields may include, for example, the identity of the originator or other user associated with the medium, date and/or time the medium was captured, distance to the medium from the current location of the client device or another location, type of medium, a rating of the medium, and/or fees, if any, required to view the medium. A person having ordinary skill in the art will appreciate that many other types of information may be useful for selecting media in which the user is interested. A search may be performed either client-side by the client viewer module or server-side by the VM in response to a request from the client viewer module. The searching may be performed by comparing inputted or selected search fields to the metadata associated with the media. In a server-side embodiment, the results of the search can be sent from the VM to the client viewer module. Results of the search can be displayed by the client viewer module on a map, in a list, or by some other graphical format. In an embodiment, the search may comprise the user defining a geographical region, for example, using a map display, and the results may comprise displaying indications of locations of available media on the map display. In an embodiment where permissions are used, media which the user does not have permission to view are not displayed in the results. Sponsored media, such as by an advertiser on the Augmented Reality Platform, may also be displayed. The sponsored media may be differentiated from media associated with a user's contacts, such as friends or members of the user's social groups.

The client viewer module may display, or work in conjunction with an application which displays, a map containing the locations associated with one or more media available for viewing by the user through the Augmented Reality Platform. The locations may be indicated by icons or thumbnails of the associated media, or by some other means. In an embodiment which utilizes thumbnails, the thumbnails may comprise low-resolution representations of the associated media.

Additionally or alternatively, the client viewer module may display a list containing locations which are associated with available media, a list of the media themselves, a list of the originators of the media, or other representations of the media. In one embodiment, the list is in the form of a carousel, such that the user may graphically rotate through the entries in the list.

In an embodiment, the client viewer module, either automatically or in response to a user interaction, notifies the user of the client device of nearby locations associated with available media. These locations can be retrieved by the client viewer module from the VM, for example, when the client device is within a predetermined range of the locations. The notification may include a message, a sound, a vibration of the client device, the initiation of an application, or the like.

In an embodiment, when the client device is within a range of an available medium, the client viewer module automatically opens an Augmented Reality viewer. The Augmented Reality viewer can be a map display or a view of reality, with indications of available media superimposed over the map display or view of reality. The indications may include, for example, icons, descriptions, low-resolution images or thumbnails of the media, or any other indication which conveys the availability of an augmented reality opportunity. The indications may be sized or otherwise ordered in relation to their distance from the client device. For example, locations of media which are farther from the client device may have smaller indications than those which are closer to the client device.

According to an embodiment, information can be displayed to enable the user to determine a value of or interest in the media. This information can be displayed in conjunction with the indications (e.g., icons, thumbnails, list entries) or in response to a user interaction, such as selecting the indication. Such information may include, for example, the identity of the originator or other user associated with the medium, date and/or time the medium was captured, distance to the medium from the current location of the client device or another location, type of medium, a rating of the medium, descriptions, comments, hyperlinks to related information, historical information, and/or fees, if any, required to view the medium. For example, the locations of media can be represented or listed in conjunction with a title, a rating, a description, an identity of the originator, and the like. A person having ordinary skill in the art will appreciate that many other types of information may be useful for display.

In an embodiment, the user of the client device can also search, sort, or filter the display or list of media based on one or more fields. These fields may include, for example, the identity of the originator or other user associated with the medium, date and/or time the medium was captured, distance to the medium from the current location of the client device or another location, type of medium, a rating of the medium, and/or fees, if any, required to view the medium. A person having ordinary skill in the art will appreciate that many other types of information may be useful for selecting media in which the user is interested. The searching, sorting, and/or filtering may be performed either client-side by the client viewer module or server-side by the VM in response to a request from the client viewer module. In a server-side embodiment, the results of the searching, sorting, and/or filtering may be sent from the VM to the client viewer module.

According to an embodiment, the client viewer module also displays locations of other points of interest, such as attractions and businesses. The client viewer module may also provide routing guidance to those locations, as well as to locations of media available for viewing. If a user of the client device is following a route from one location to another, the client viewer module may display the locations of available or sponsored media along or near the route. The client viewer module may also provide a guided route between two or more locations of media available for augmented viewing.

In an embodiment, when a user of the client device is within a predetermined range of a location associated with a medium available to the user through the Augmented Reality Platform, the marker and/or medium is automatically retrieved by the client viewer module from the VM and stored in a memory of the client device. In addition or alternatively, the marker and/or medium can be retrieved and stored in a memory of the client device in response to a user interaction, such as a selection of an icon, thumbnail, or list entry representing the medium. Sensor data and other information associated with the marker and/or medium, including information concerning the relationship between the marker and medium, can also be retrieved from the VM either simultaneously, contemporaneously, or subsequently. In an embodiment where the sensor data and other information is retrieved simultaneously with the marker and/or medium, the sensor data and other information can be, partially or wholly, packaged or encoded with the marker and/or medium, for example, in an EXIFF file.

The user of the client device, may position the client device, such that a view of reality associated with the medium is visible in the optical viewer. The client viewer module may aid the user in positioning the client device. For instance, the client viewer module may use the sensor data associated with the medium to provide instructions to the user on how to position the client device, for example, through verbal cues or by displaying instructions on the client device, including on the optical viewer. In an embodiment, the client viewer module compares the retrieved sensor data associated with the medium with sensor data provided by the client device, and instructs the user how to position the client device such that the sensor data provided by the client device matches the retrieved sensor data associated with the medium. In an embodiment, cues can be given to the user by the client viewer module through the display of the client device. The cues may be overlaid over a view of reality being displayed on the display of the client device. The cues may include, for example, a silhouette, outline, or mosaic of the marker, position in which the user should stand, or position or orientation in which the device should be placed. The user may utilize these cues to properly position himself or herself and properly align the marker with the view of reality. In some embodiment, when the user is in the best or near-best alignment, the current view of reality can be used as the marker, instead of the marker retrieved from the VM. In this manner, the old marker is switched out for a more relevant and current marker.

The client viewer module uses the marker for pattern-matching with the view of reality by comparing the marker with a view of reality visible in the optical viewer. In an embodiment, the client viewer module attempts to match the marker or patterns in the marker to the view of reality or patterns in the view of reality. For example, if both the marker and the view of reality contain a mountain range, the client viewer module may attempt to align the mountain range in the marker with the mountain range in the view of reality. A variety of methods and algorithms may be used to perform the pattern-matching. For example, Metaio™ produces a software development kit (SDK) which includes suitable pattern-matching algorithms. Other entities and products, such as Eyedea™, Layar™, Qualcomm's Vuforia™, and/or Aurasma™, also provide suitable pattern-matching algorithms. The algorithms can also be combined with proprietary object-tracking algorithms. For instance, based on known patterns, features, or objects in the current view of reality, the X-Y on-screen locations of the elements can be known, predicted, or determined from frame to frame. In this manner, the on-screen locations of the elements can be traced and tracked based on the associated pixel orientations (or mathematical/visual derivatives thereof) determined by the matching of the elements in the current view of reality to the elements in the marker.

In an embodiment, the client viewer module may use the sensor data to aid in pattern-matching. For example, the client viewer module may use information concerning the location and orientation of the client device at the time that the marker was captured to determine which portions of the view of reality should be compared to the marker. An algorithm to weigh each of the available metrics from the sensor data and/or optical viewer can be utilized to weight the probability that the user is in the proper location and pose/orientation, thereby displaying the proper media and enhancing the user experience.

Once the client viewer module has aligned the marker with the view of reality, it can superimpose the medium, which may comprise an effect, over the view of reality. In an embodiment, the client viewer module uses information concerning the relationship between the medium and marker to align the superimposed medium with the view of reality. In an embodiment, if the client viewer module is unable to match the marker with the view of reality, it may use the location and orientation data captured at the time that the marker was captured to align the medium with the view of reality. Once the medium has been superimposed over the view of reality, as visible through an optical viewer, the view of reality has been augmented. In an embodiment, the client viewer module may enable the user to increase or decrease the transparency of the superimposed medium.

In an embodiment, the client viewer module can utilize a pattern-matching algorithm which creates local affine frames and maximally stable extremal regions within the current view of reality. These frames and regions can then be matched to the previously created marker. When comparing the marker to the current view of reality, the client viewer module can determine a probability or probabilities that the user is at or near the same location and at the same orientation/pose as when the medium was pinned. For instance, a probability can be measured by comparing the metadata of the marker (e.g., yaw, pitch, roll, direction coordinates, pattern-matching, lighting, etc.) to the current view of reality and/or real-time sensor data from the client device. A match can be confirmed when the probability meets a certain, predetermined threshold. In an embodiment, once the match is confirmed, the newly created frames and regions can be utilized as the marker that the client viewer module tracks and which is used to augment the view of reality with the pinned digital effect. In this manner, the marker is "switched." The previously generated marker only serves as a confirmation, and the marker that is actually utilized by the module is from the current view of reality. This allows the user to enjoy a more relevant experience according to the current localized lighting and environmental conditions which affect the pattern-matching. In an embodiment, the current lighting and time-of-day conditions can be measured by the client device to accommodate and match the best marker for the pattern comparison and/or marker switching.

Any marker in a memory of the client device or server and available to the client viewer module can be utilized in the above manner. For instance, multiple marker files can be retrieved (e.g., using a query) or generated for a view of reality or a portion or portions of the view of reality. These multiple marker files can be used to augment the same view of reality with a plurality of media or effects.

In an embodiment, the client device may comprise one or more secondary cameras or optical viewers. These secondary cameras may be configured to scan a periphery of the client device and conduct marker matching/switching prior to a view of reality coming within view of the primary camera of the client device. Then, when the client device is moved, such that the view of reality does come within the view of the primary camera, the effects can be quickly engaged without the delay required for recognition and downloading/uploading of data. In this manner, multiple markers and their associated media can be readied for revelation without relying on a single camera or optical viewer, and performance time, as well as the user experience, can be improved.

In an embodiment, simultaneous location and mapping (SLAM) can be utilized in a multi-camera mode to continually scan and assign the existing periphery continuation of a three-dimensional medium. Whereas, in a single camera unit, the monocle will only be utilized for the initial rendering and display of the immediate view of the medium, secondary and tertiary camera units can serve as the seeking and assignment for the continual propagation (i.e., hanging) of the medium in a continuous and fluid manner. This gives the medium the ability to remain in context as the scene changes with changes in point of view.

In an embodiment, once a user has properly positioned the client device, such that a marker for a particular medium has been matched, additional media and effects may be displayed to the user through the client viewer module based on a vector position which is relative to the position of the matched marker.

In an embodiment, the user may capture a photograph or video of the augmented view of reality which includes the superimposed medium, using the client viewer module or another application which is configured to communicate with the optical viewer and the client viewer module. The augmented view of reality, as captured in the photograph or video, may include the user or other individuals or objects interacting with reality. In this manner, individuals can "jump" into the augmented view of reality, and appear to be present in or interacting with the augmented view of reality, including the superimposed medium. In the scenario where the medium is a historical image, a generational image can be obtained which would otherwise be impossible. For example, the user can "jump" into the augmented (i.e., historical) view of reality, and appear to have traveled back in time.

3. Example Embodiments

Illustrative, non-limiting embodiments of a client application for an Augmented Reality Platform will now be described with reference to the figures.

a. Client Perspective Module

Figure 1:
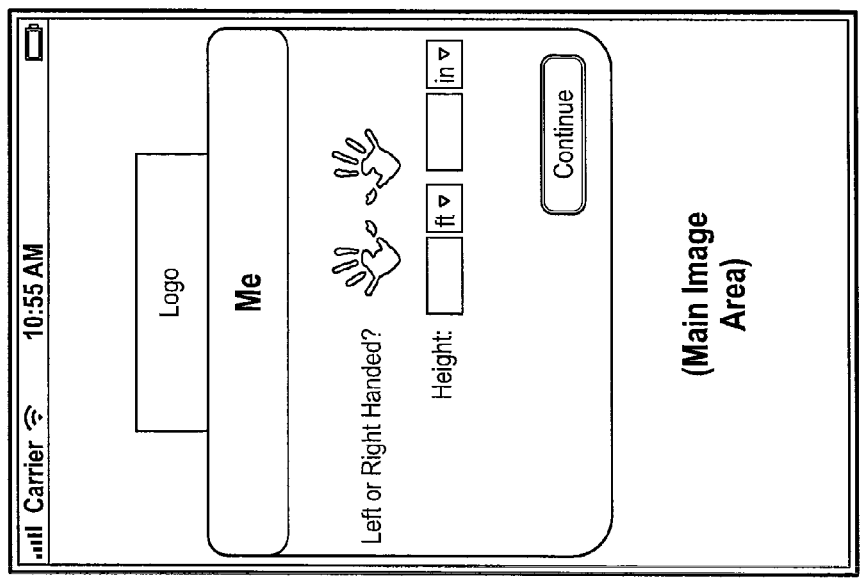
FIG. 1 illustrates a display for obtaining information about a user of a client device, according to an embodiment.

FIG. 1 illustrates a display for obtaining information about the user of the client perspective module, which can be stored in the VM and aid the client viewer module or user of the client viewer module in aligning a marker and/or medium with a view of reality. Such information may include, for example, whether the user of the client perspective module is left-handed or right-handed, and the height of the user. It may frequently be the case that the user of the client viewer module with respect to a particular medium is different-handed, a different height, or different in some other way than the user of the client perspective module who originated that medium. In such cases, the different users may have different perspectives of the same view of reality. Thus, it may be beneficial to have such information about the originator in order for the client viewer module to better instruct or otherwise aid a different user in orienting the client device so that a marker can be matched with a view of reality and a medium superimposed on the view of reality.

FIG. 2 illustrates a display for obtaining from the user authentication information required to access the Augmented Reality Platform. Required inputs may include a username or email address and a password. In order to access the Augmented Reality Platform, the user may have the option, or alternatively be required, to authenticate using an account with a third-party service provider, such as Facebook®. The display may also include an option to register for an account, either with the Augmented Reality Platform or a third-party service provider.

Figure 3:
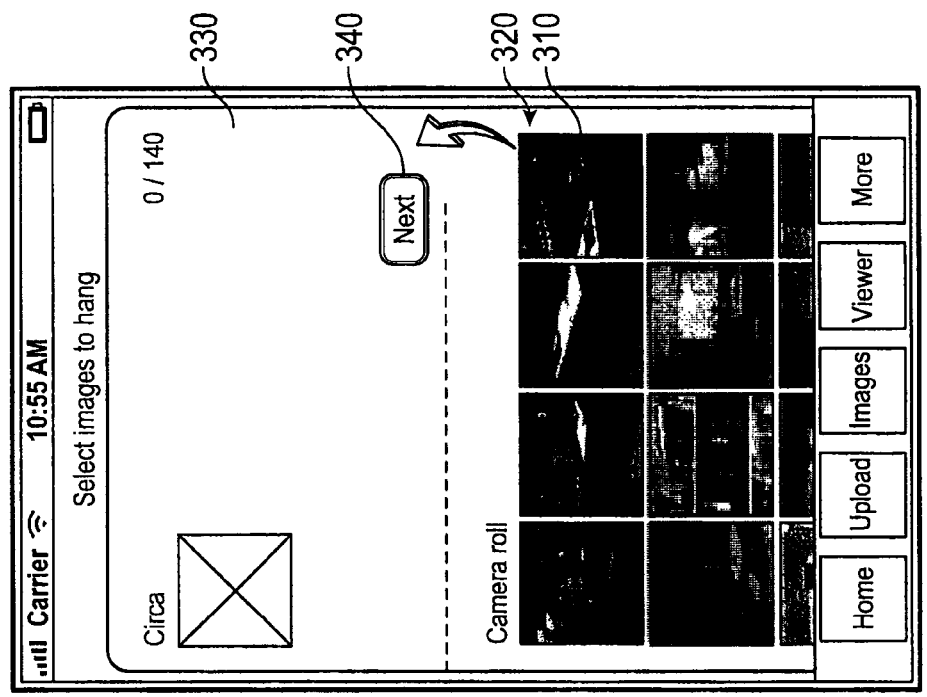
FIG. 3 illustrates a display by which a user may view and select a medium to associate with a view of reality, according to an embodiment.

FIG. 3 illustrates a display by which a user may view and select a medium to "hang," i.e., superimpose over a view of reality. The client perspective module may comprise a wizard which walks a user through the steps of "hanging" or "pinning" a medium to a view of reality. The wizard may comprise one or more screens, which guide the user through the hanging process. It should be understood that one or more of the wizard screens may be skipped by the user and/or subsequently returned to by the user. The user may select the medium 310, in this case an image, from a list of media 320 stored in a memory on a client device. For example, the user may interact with a touch-screen of the client device by tapping on the medium 310 or dragging the medium 310 from the list 320 to the selected medium region 330. Once the user has selected the medium or media which the user wishes to hang, the user can interact with the user interface, for example, by pressing an action button 340 to move to the next screen of the wizard.

Figure 4:
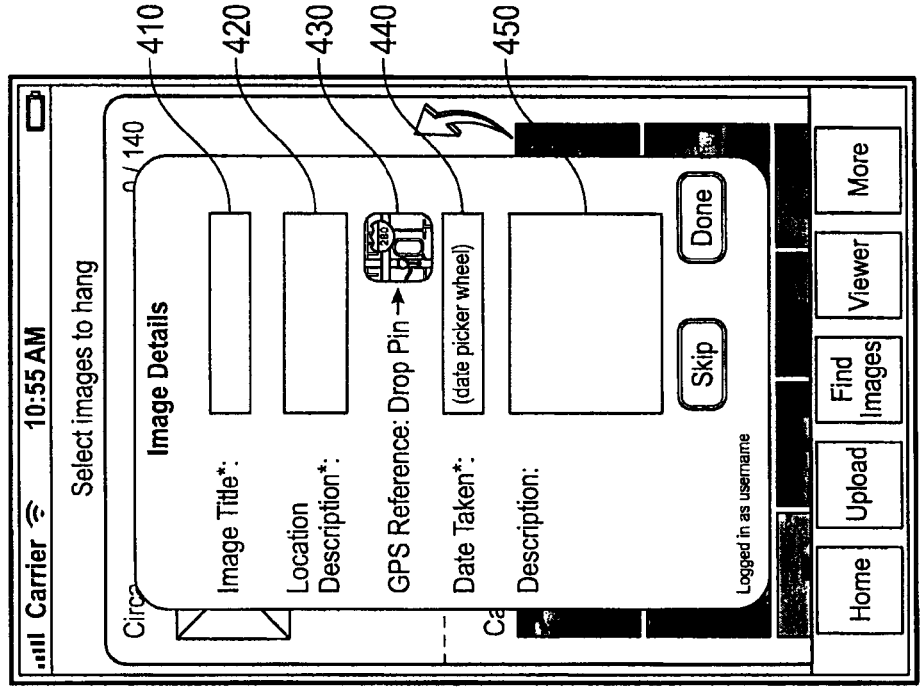
FIG. 4 illustrates a display by which a user may input information associated with a medium, according to an embodiment.
Figure 5:
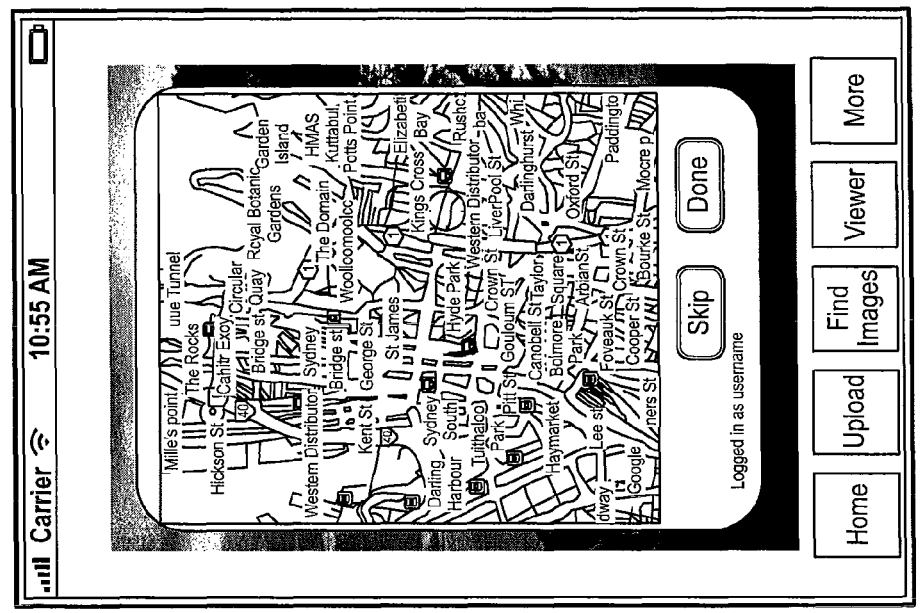
FIG. 5 illustrates a map display which enables a user of a client device to indicate a location associated with a medium, according to an embodiment.

FIG. 4 illustrates a display by which the user may input information to be associated with the selected medium or media. This display may be shown, for example, automatically after a user has selected the medium, automatically after a user has hung a selected medium, or at a different time in response to a user interaction with the client perspective module. The inputs may comprise textboxes into which the user can enter a title 410, location description 420, date that the medium was captured 440, and/or a description of the medium 450. The inputs may also include a GPS reference 430. The GPS reference input may comprise a map display, as shown in FIG. 5, which enables the user to indicate a location of the medium on the map, for example, by tapping (e.g., via a touch-screen interface of the client device) a point on the map. This interaction may result in a pin being dropped on the tapped location. The GPS reference input can be used as location information associated with the medium and may be in addition to or instead of data from a GPS sensor of the client device. A person having ordinary skill in the art will appreciate that it may beneficial to obtain additional information as well. Some of the information may be pre-populated based on information associated with the image file (e.g., metadata) or information acquired from the client device (e.g., GPS coordinates for GPS reference 430).

Figure 6:
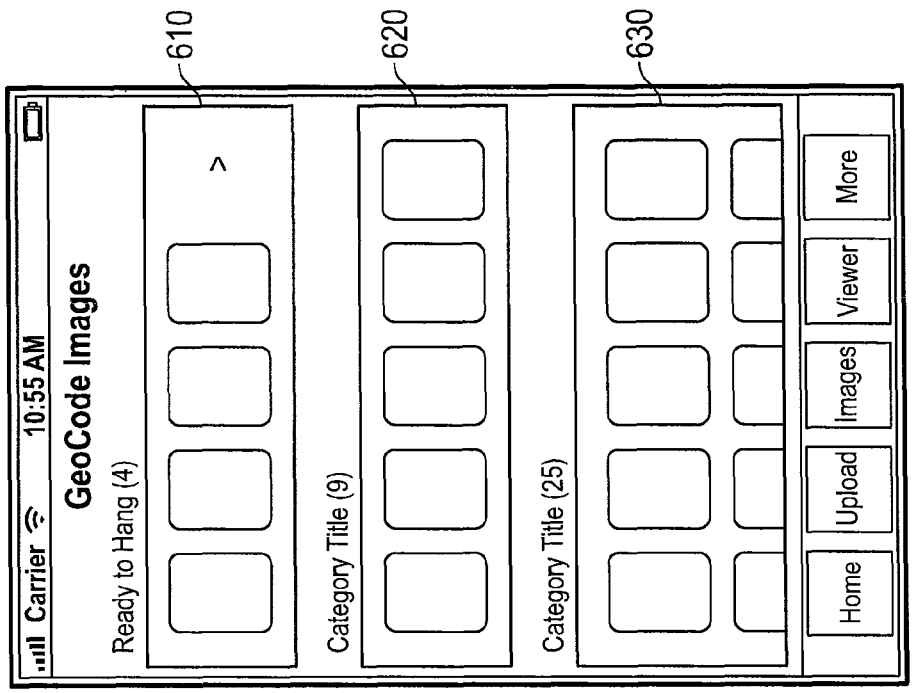
FIG. 6 illustrates a display by which a user can view and select media stored on the client device, according to an embodiment.
Figure 7:
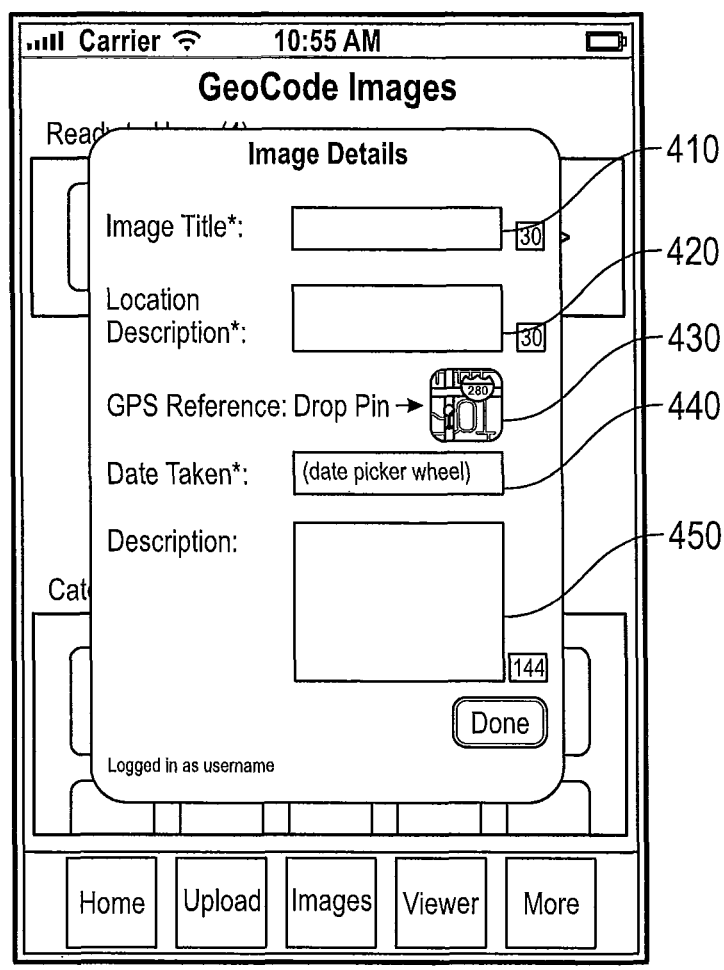
FIG. 7 illustrates a display by which a user may input information associated with a medium, according to an embodiment.

FIG. 6 illustrates a display by which a user can view and/or select media stored in a memory on the client device. The media may be categorized, for example, according to their progress within the client perspective module. For instance, one category 610 can represent media for which all required information from the user has been provided and/or the location of the media is within a range of the client device. A second category 620 can represent media for which all required information from the user has been provided but the location of the media is not within a range of the client device. A third category 630 can represent media for which not all required information has been provided. Further categories or a different combination of categories may also be provided. In response to a user interaction, such as selecting a medium by, for example, tapping an icon or thumbnail associated with the medium, the client perspective module may generate an input display for entering information, such as shown in FIG. 7. The input display may be similar or identical to the input display in FIG. 4, or different from the input display in FIGS. 4 and 7.

Figure 8:
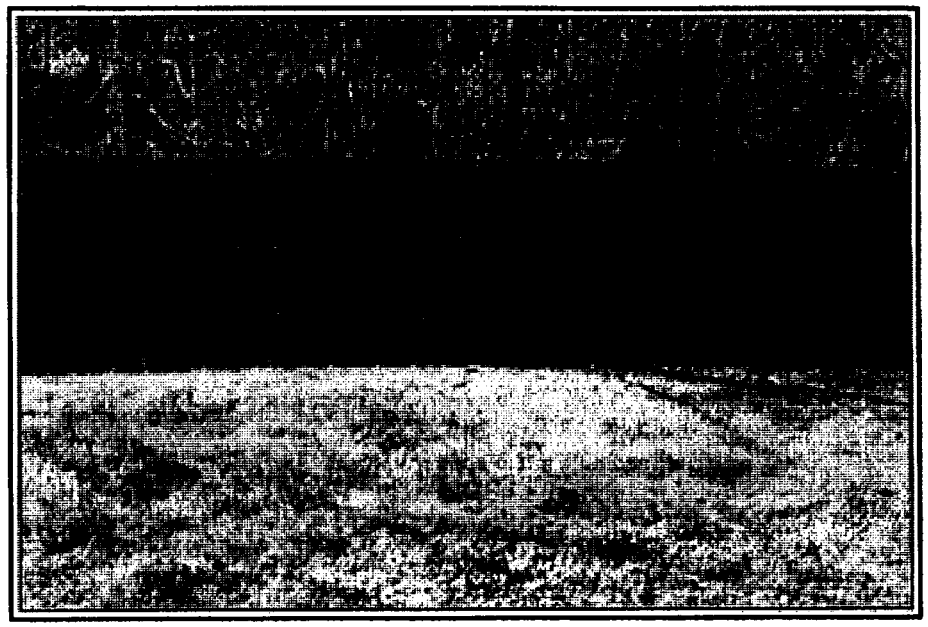
FIG. 8 illustrates a view of reality, according to an embodiment.
Figure 9:
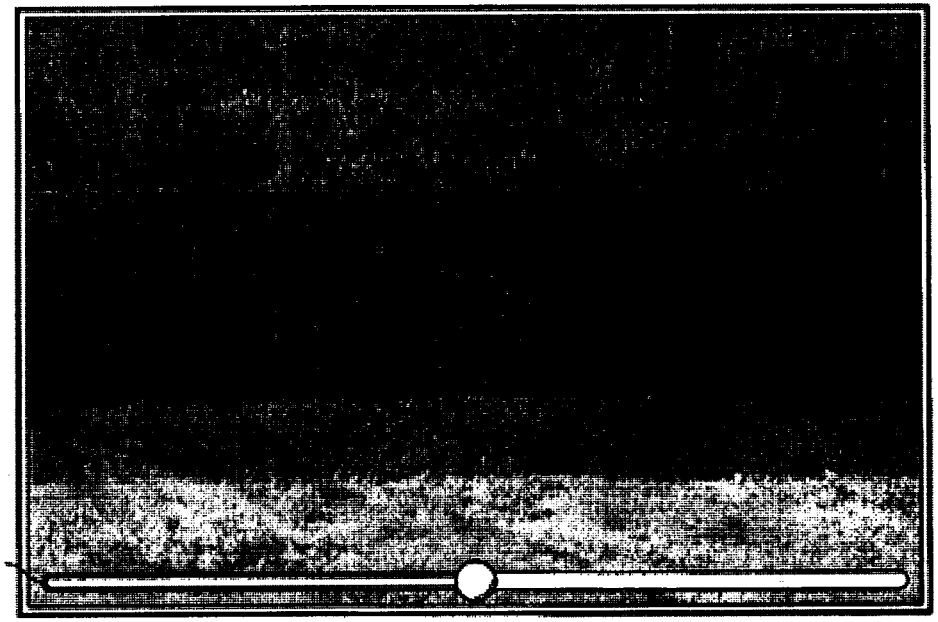
FIG. 9 illustrates a medium superimposed over a view of reality, according to an embodiment.
Figure 10:
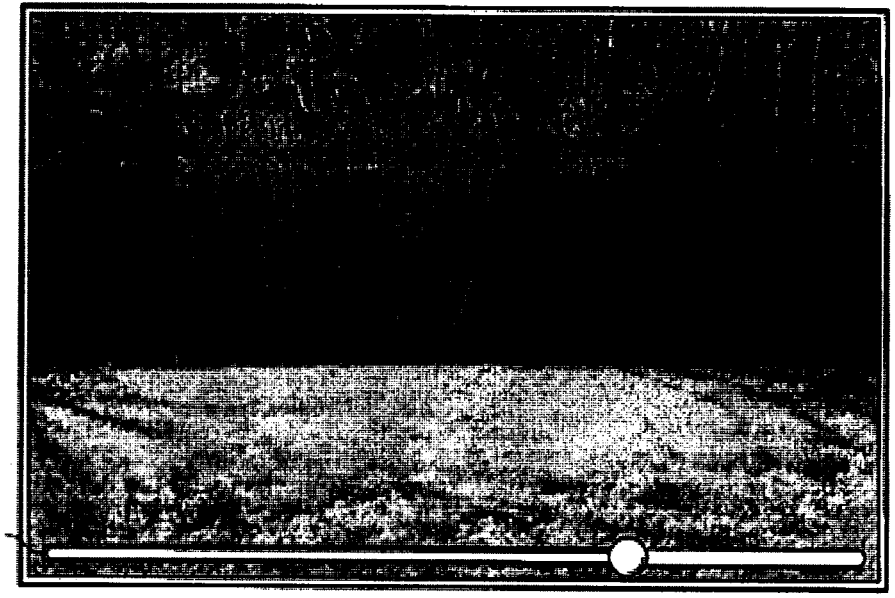
FIG. 10 illustrates a medium superimposed over and aligned with a view of reality, according to an embodiment.

Once the user has indicated a selection of a medium to hang, the client perspective module may display a view of reality, as shown in FIG. 8, along with the medium superimposed transparently over the view of reality, as shown in FIG. 9. The user may then align the transparent superimposed medium with the view of reality, as shown in FIG. 10, for example, by manipulating (e.g., resizing or rotating) the superimposed medium, reorienting the client device, or both. In an embodiment, this manipulation is performed by interacting with a touch-screen of the client device (e.g., pinching fingers together to shrink a medium, spreading fingers apart to enlarge a medium, rotating two fingers to rotate a medium, etc.).

Figure 11:
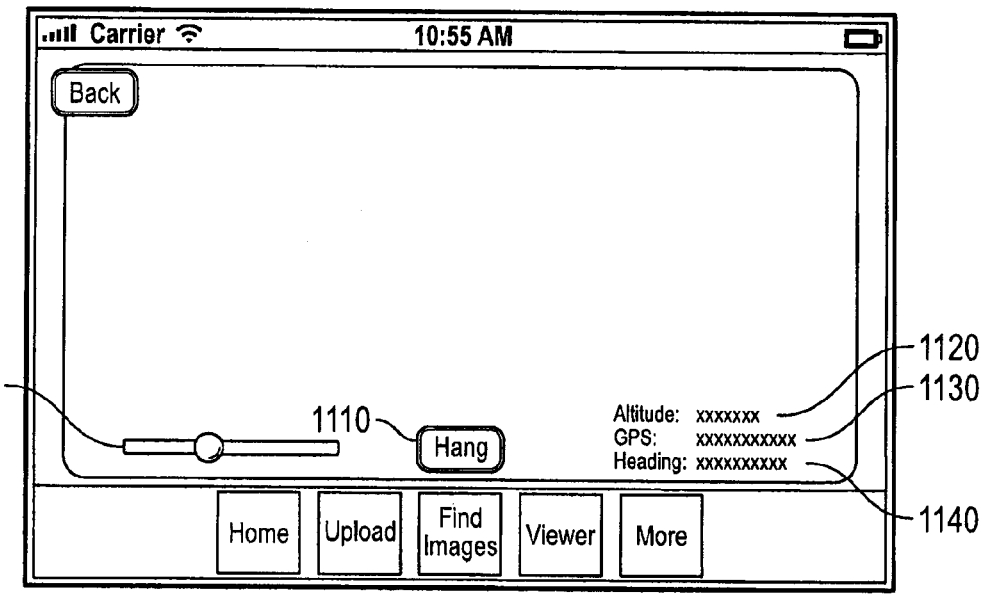
FIG. 11 illustrates an overlay for a view of reality, according to an embodiment.

FIG. 11 illustrates an overlay of the view of reality, as seen through the optical viewer. The overlay can aid the user in aligning the superimposed medium with the view of reality or provide the user with information about the view of reality. For example, the overlay may include location information, such as an altitude 1120, GPS coordinates 1130, and/or a heading 1140. The overlay may also include an action button 1110, such that when the user selects the action button 1110, the current view of reality in the optical viewer or a portion of the view of reality is captured as a marker. The overlay can appear differently based on the handedness of the user, i.e., whether the user is left-handed or right-handed. For example, the positions of information and interactive buttons or other features of the overlay can be different (e.g., on different sides of the display) based on the handedness of the user.

Figure 12:
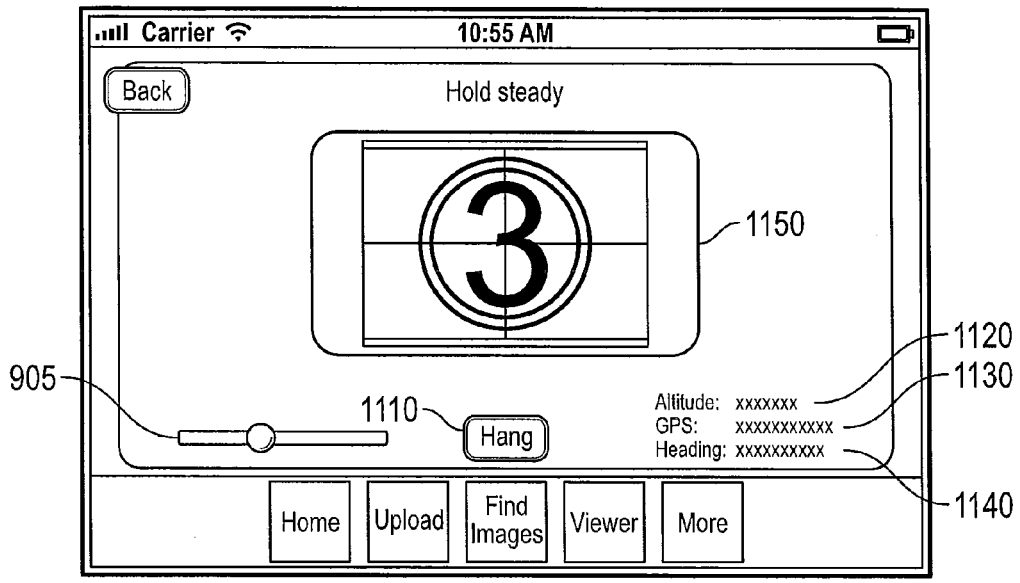
FIG. 12 illustrates a timer which may be configured for capturing a marker associated with a medium, according to an embodiment.

Selection of the action button 1110 on the overlay may result in a timer 1150 being displayed, as shown in FIG. 12. The timer 1150 may be set for a predetermined duration, and may comprise a partially transparent overlay. The user may continue to adjust the superimposed medium and/or the client device for the duration of the timer 1150. Once the timer 1150 expires, the client perspective module can capture the marker. Alternatively, the user may be required to hold the client device steady for the duration of the timer 1150, permitting the client perspective module to capture information regarding the augmented view of reality for the duration of the timer 1150.

According to an embodiment, since the client device is physically at the location at which the medium was captured, sensor data can be simultaneously obtained and measured as it actually occurs in the field. A system which uses images of the location (e.g., images collected from Google® Street View) or second-hand sensor data to position the medium may not be as accurate, since it can not account for interferences (e.g., magnetic, electrical, etc.) which might affect the client device at the physical location and having the orientation at which the medium is to be viewed. By enabling users to physically take the client device to the location at which the medium is to be viewed and to capture the marker and sensor data simultaneously, more accurate sensor data and positioning information may be obtained. This can aid in the use of the client viewer module, as discussed in detail below. For instance, the more accurate sensor data can aid the user of the client viewer module in positioning the client device, and/or aid the client viewer module in superimposing the medium over a view of reality.

Figure 13:
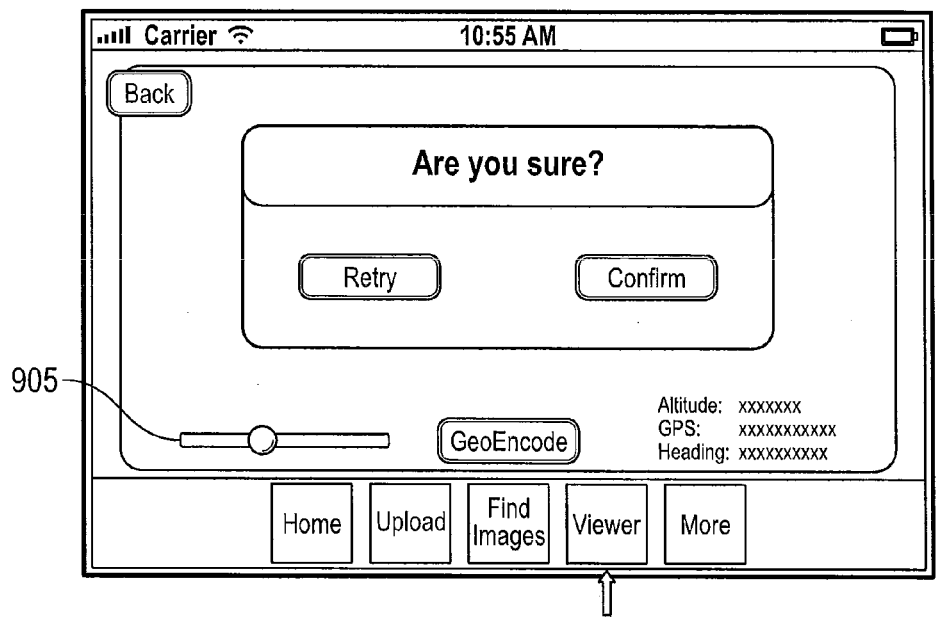
FIG. 13 illustrates a prompt for a user of a client device to confirm that the capture of a marker associated with a medium is acceptable, according to an embodiment.
Figure 14:
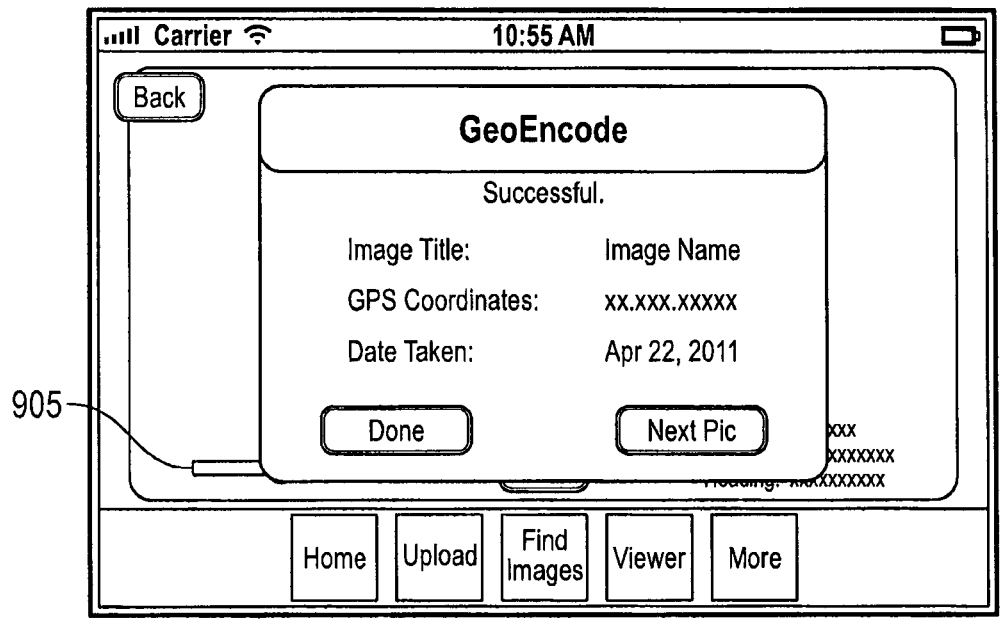
FIG. 14 illustrates a prompt for a user of a client device to upload captured information to a Virtual Map, according to an embodiment.
Figure 15:
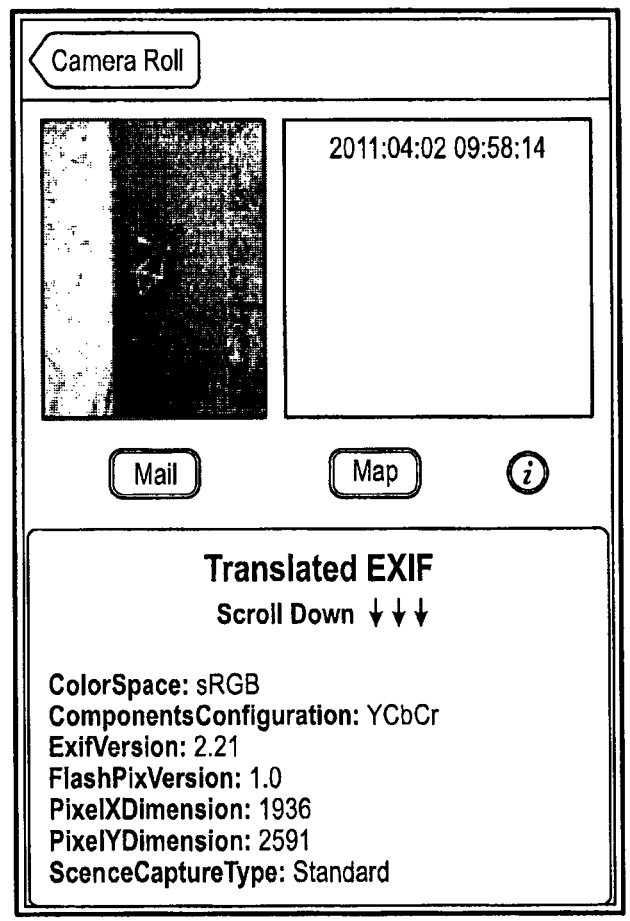
FIG. 15 illustrates a display of the contents of an Exchangeable Image File Format file, according to an embodiment.

In an embodiment, if the client perspective module is not able to sufficiently capture the marker, its relationship to the medium, and/or the required sensor data, the user may be prompted to retry the capture process. Once the marker has been captured successfully, the user can be prompted to confirm that the capture is acceptable, as shown in FIG. 13. If the user confirms that the capture was acceptable, the user may be prompted to upload the captured information to the VM, or to perform additional captures for other media stored in the memory of the client device, as shown in FIG. 14. If the user elects to upload the captured information, the captured information, including the marker, medium, sensor data, and/or other information, may be packaged into a save or modify request and sent to the VM. Sensor data and other information associated with the media can be, partially or wholly, packaged or encoded with the associated medium and/or marker, for example, in an EXIFF file, an example representation of which is shown in FIG. 15. Alternatively, the captured information may be packaged and sent to the VM automatically after successful capture or once the user confirms that the capture was acceptable.

Figure 26:
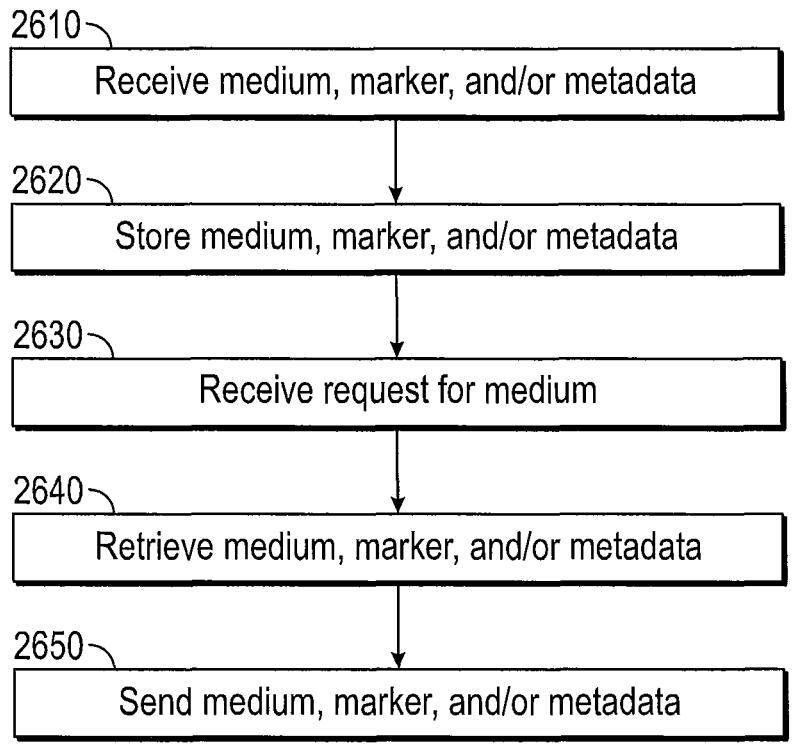
FIG. 26 is a high-level block diagram of a process for maintaining a Virtual Map, according to an embodiment.

The VM is configured to receive the save or modify request and/or the packaged captured information, and store the information in one or more databases for future retrieval by the client viewer module or modification by the client perspective module. FIG. 26 illustrates a high-level diagram of a process for storing and retrieving media, according to an embodiment. In step 2610, the VM receives a medium, marker, and/or metadata associated with the medium and/or marker, for example, from a client perspective module executing on a client device. In step 2620, the medium, marker, and/or metadata are stored in one or more databases either locally or remotely accessible to the VM. Subsequently, in step 2630, the VM may receive a request for the particular medium, for example, from a client viewer module executing on a client device. In step 2640, in response to the request, the VM retrieves the medium, marker, and/or metadata from the one or more databases and send the retrieved data to the client viewer module of the client device.

Figure 27:
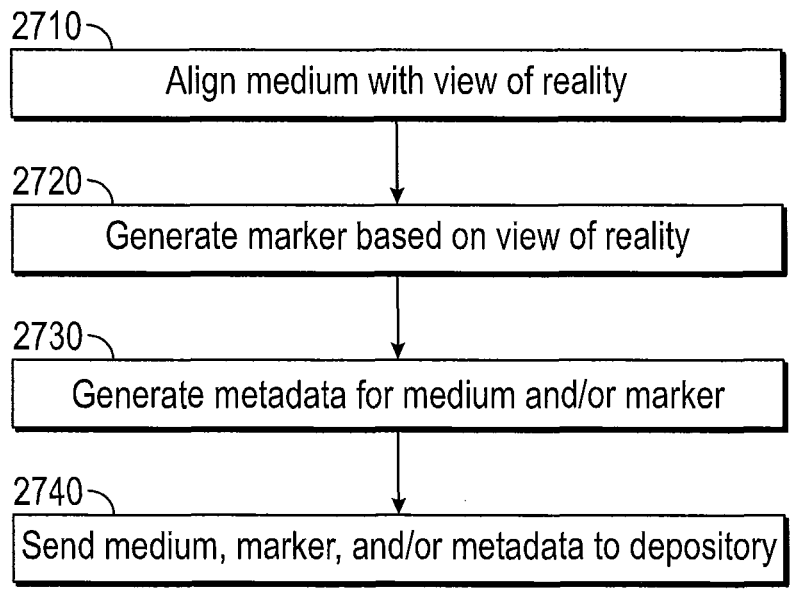
FIG. 27 is a high-level block diagram of a process for associating a medium with a view of reality, according to an embodiment.

FIG. 27 illustrates a high-level diagram of a process for generating a marker, according to an embodiment of the client perspective module. In step 2710, the medium is aligned with a view of reality. This alignment may be performed by the client perspective module and, in some embodiments, aided by the user of the client device executing the client perspective module. In step 2720, the marker is generated based on the view of reality and the alignment. The marker is then uploaded to the VM in step 2740.

b. Client Viewer Module

Figure 16:
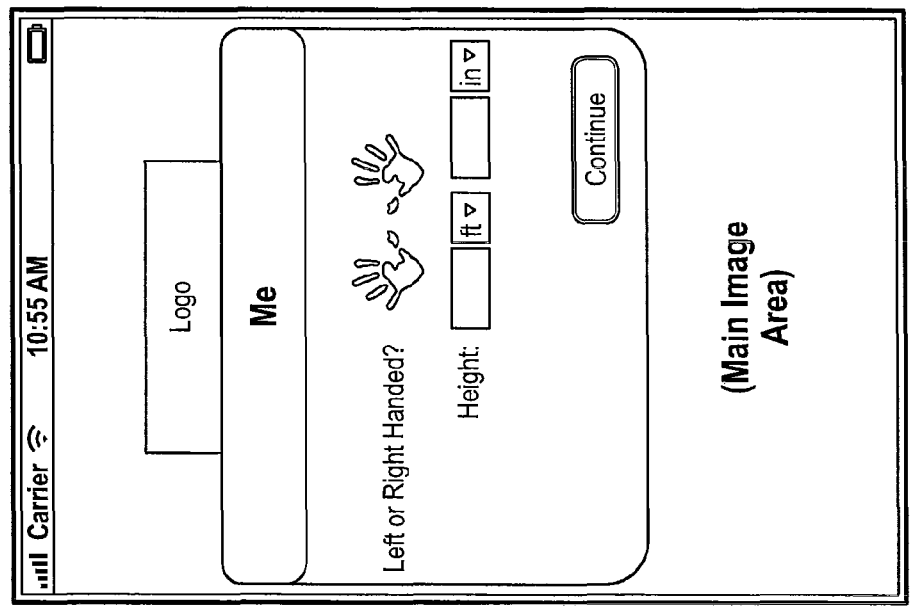
FIG. 16 illustrates a display for obtaining information about a user of a client device, according to an embodiment.

FIG. 16 illustrates a display for obtaining information about the user of the client viewer module, which can aid the client viewer module or user of the client viewer module in aligning a marker and/or medium with a view of reality. Such information may include, for example, whether the user of the client viewer module is left-handed or right-handed, and the height of the user. It may frequently be the case that the user of the client viewer module with respect to a particular medium is different-handed, a different height, or different in some other way than the user of the client perspective module who originated that medium. In such cases, the different users may have different perspectives of the same view of reality. Thus, it may be beneficial to have such information about the user of the client viewer module in order for the client viewer module to better instruct or otherwise aid the user in orienting the client device so that a marker can be matched with a view of reality and a medium superimposed on the view of reality.

Figure 17:
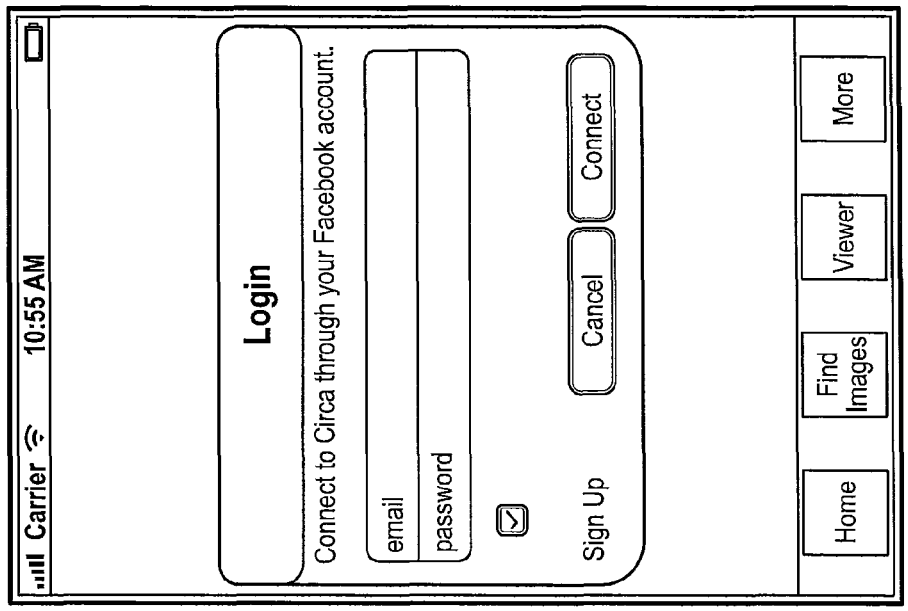
FIG. 17 illustrates a display for obtaining authentication information from a user of a client device, according to an embodiment.

FIG. 17 illustrates a display for obtaining from the user authentication information, which in an embodiment is required to access the Augmented Reality Platform. Required inputs may include a username or email address and a password. In order to access the Augmented Reality Platform, the user may have the option, or alternatively be required, to authenticate using an account with a third-party service provider, such as Facebook®. The display may also include an option to register for an account, either with the Augmented Reality Platform or a third-party service provider.

FIG. 18 illustrates a display for listing media available for viewing by a user of the client viewer module. The display may list available media at nearby locations or locations within a range of the client device, including a thumbnail of the medium and/or a representation 1810 of the originator of the medium, the originator 1820 of the medium, the date or approximate date 1830 of capture, the number of times the medium has been viewed 1840, the distance 1850 of the medium from the client device, and the like. The display may list the media by originator of the media, including the number of media available 1860 from that originator at a particular location, and in some embodiments, a number of media recently made available 1870 from the originator at the particular location.

The display may include filter options 1880, for example, to enable the user to limit the listing of media to media available at locations within a certain distance or radius of the client device. The display may also include sort options 1890, to enable the user to sort available media based on, for example, date that the medium was captured, originator of the medium, whether or not the medium has been previously viewed by the user, ratings, most viewed media, and/or distance. The display may also include a listing of media which are sponsored by an organization, for example, by an advertiser on the Augmented Reality Platform. Sponsored media can be distinguished from non-sponsored media, so that it is clear to the user which media are sponsored by advertisers and which are not.

FIG. 19 illustrates a display for listing available media using a carousel format. The carousel format can be displayed when the client device is within a predetermined or set range of the media. In an embodiment, the carousel displays media which are available from a single originator at or near the location of the client device. The carousel enables the user to rotate entries for media between a foreground 1910 and background 1920 and displays information concerning the media, such as a title, originator, distance, rating, and whether or not the user of the client device has previously viewed the media.

Figure 20:
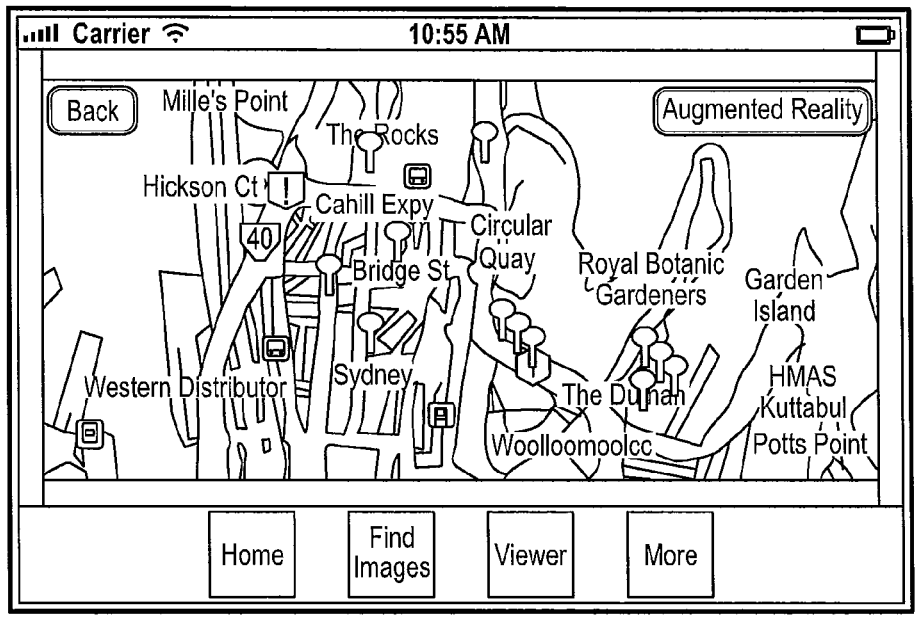
FIG. 20 illustrates a map display for listing media available for viewing, according to an embodiment.

FIG. 20 illustrates a display for listing available media using a map display. The locations of available media may be indicated on the map display using icons, such as pushpins. In an embodiment, the map displays media which are available from a single originator at or near the location of the client device. The icons may be interactive. For example, a selection of the icons by the user may result in displays of additional information related to the associated media.

Figure 21:
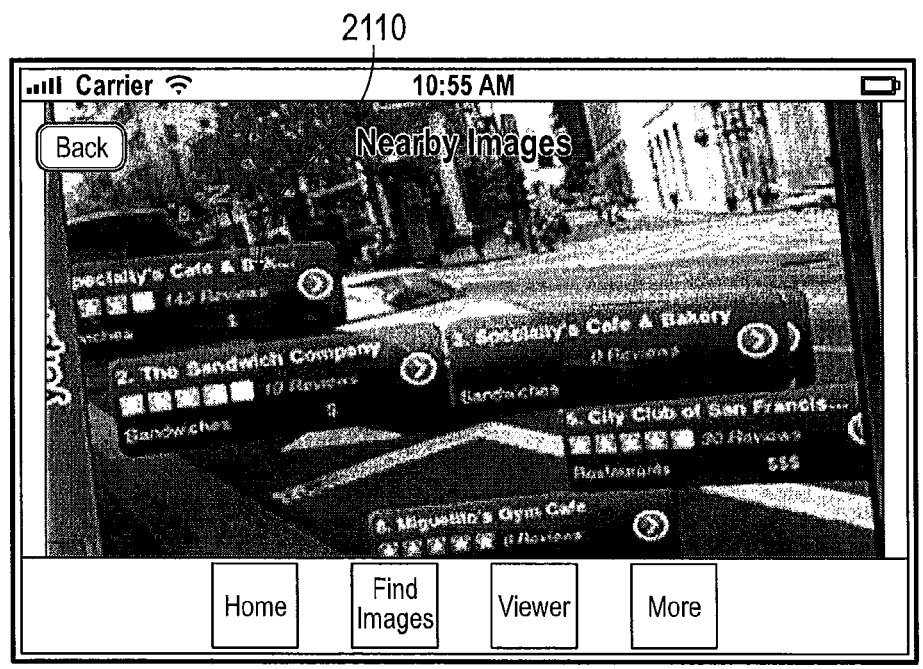
FIG. 21 illustrates an Augmented Reality Window which displays a view of reality with superimposed indications of media available for viewing, according to an embodiment.

FIG. 21 illustrates an Augmented Reality Window. The Augmented Reality Window can be automatically displayed when the user gets close to an available medium or media. The client device may chime, vibrate, or otherwise alert the user of the client device that an augmented reality opportunity is available. This alert or notification can be performed in conjunction with the display of the Augmented Reality Window. As shown, the Augmented Reality Window can display a representation 2110 of each medium (e.g., icon, title, description, etc.) at a position in the window which corresponds to the position of the corresponding medium.

The client viewer module may retrieve information concerning the available media from the VM, including the marker, medium, information concerning the relationship of the marker and medium, sensor data, and/or other information. This information may be packaged or encoded together, for example, in an EXIFF file. The client viewer module may automatically retrieve the media information when the client device is within a predetermined or set range of the location associated with the media, or may retrieve the media in response to a user interaction, such as a selection of the media for viewing.

Figure 22:
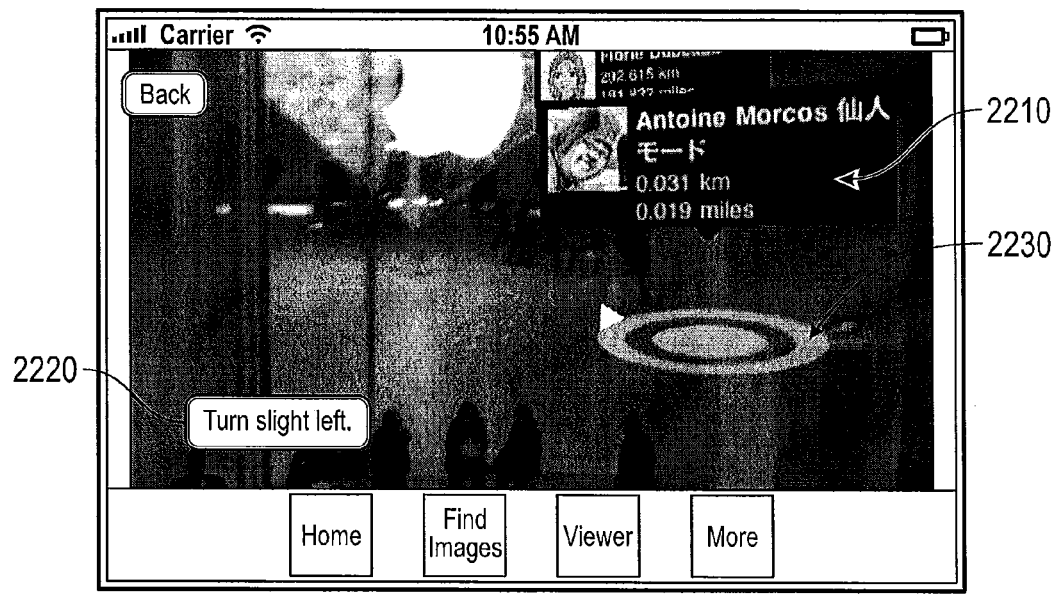
FIG. 22 illustrates an Augmented Reality Window which displays instructions to aid the user of a client device in positioning the client device, according to an embodiment.

In an embodiment, the Augmented Reality Window is in communication with a camera feature or other optical viewer of the client device, and displays a view of reality with superimposed indications 2210 of available media, such as icons, descriptions, or the media themselves. As shown in FIG. 22, the Augmented Reality Window can also display instructions 2220 to aid the user of the client device in positioning the client device. For example, an instruction such a "turn left," "turn right," "up," "down," and the like may be displayed. A target 2230 or arrows, indicating where the user should stand or position the client device can also be displayed. The instructions 2220 may be superimposed over the view of reality.

Figure 23:
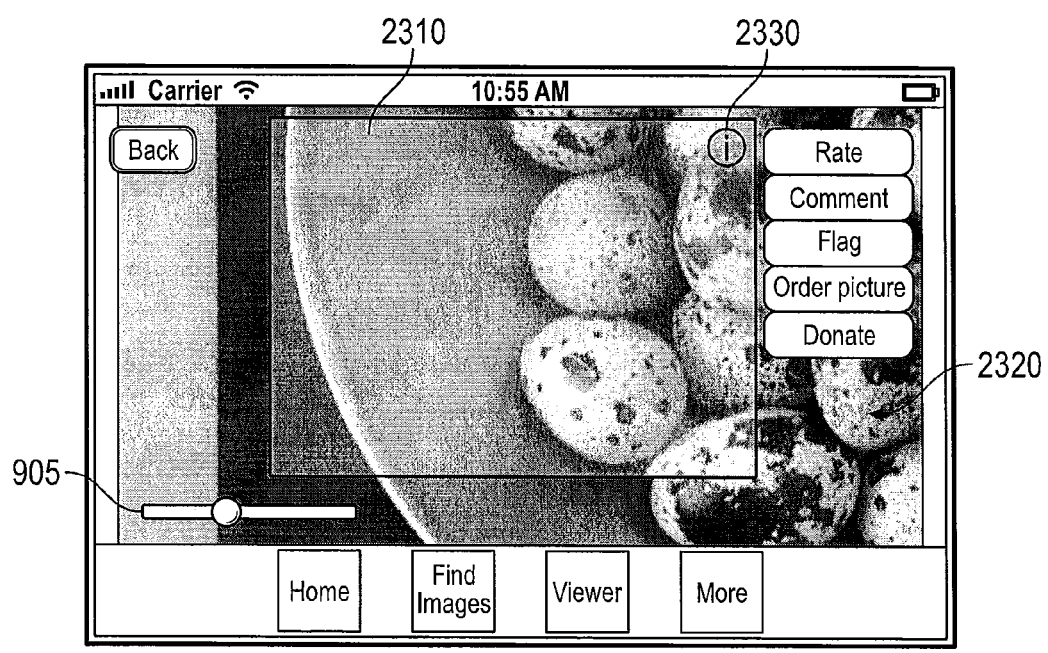
FIG. 23 illustrates an Augmented Reality Window which displays a superimposed medium over a view of reality, according to an embodiment.
Figure 24:
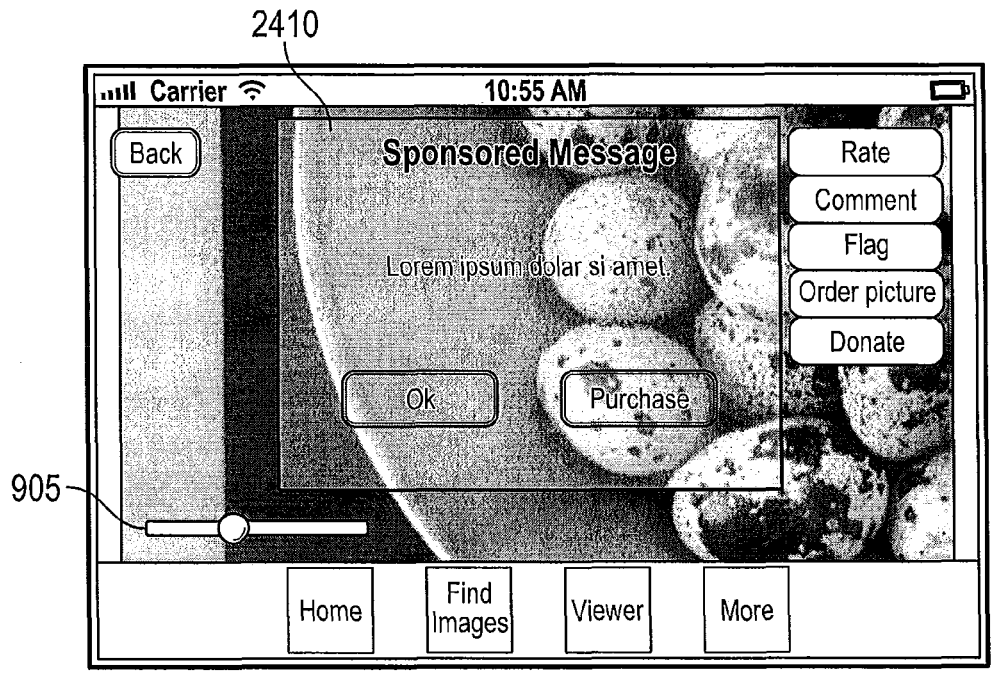
FIG. 24 illustrates an Augmented Reality Window which displays a sponsored message, according to an embodiment.
Figure 25:
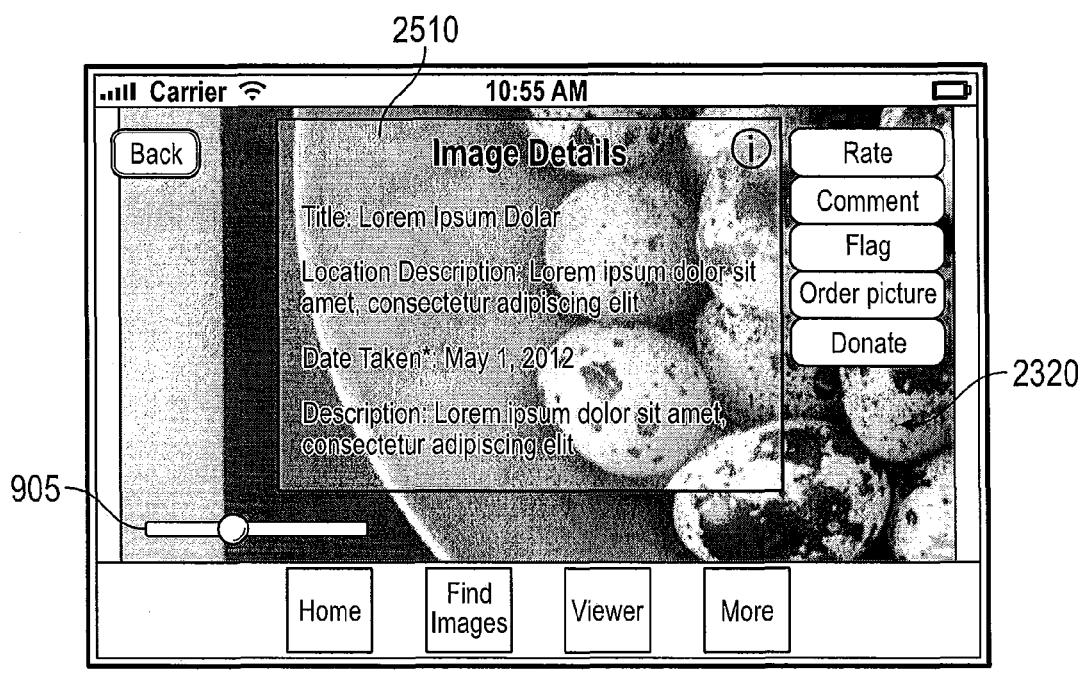
FIG. 25 illustrates an Augmented Reality Window which displays information associated with a medium, according to an embodiment.

In an embodiment, as the user is positioning the client device, the client viewer module attempts to pattern-match the marker to a view of reality in the Augmented Reality Window. The client viewer module may use the sensor data to aid in aligning the marker with the view of reality. Once the client viewer module has determined where the marker matches the view of reality, the client viewer module can superimpose the medium 2310 over the view of reality 2320 using the captured information concerning the relationship of the medium to the marker, as shown in FIG. 23. A sponsored message 2410 may also be displayed before, after, or simultaneously with the superimposition of the medium, as shown in FIG. 24. Additional information 2510 associated with the superimposed medium can also be displayed, as shown in FIG. 25. The additional information 2510 can be displayed, for example, in response to a user interaction, such as the selection of an information button 2330 as shown in FIG. 23.

In an embodiment, the client viewer module can superimpose a video over a view of reality. In this embodiment, the client perspective module may obtain real-world markers for each frame or a subset of frames from the video. The real-world markers may comprise the frames of the video medium itself. The client viewer module may then perform pattern-matching between the real-world markers and the view of reality in order to superimpose frames of the video medium onto the view of reality. Where a video was not taken from a stationary position, i.e., the camera position changes from frame to frame, the superimposition of the medium may also change such that it appears to move within the augmented view of reality. In such an embodiment, the pixel locations of the superimposed medium are adjusted as the background of the medium continually changes. For example, the medium may be a video of an individual skateboarding from left to right, with the camera view used to capture the medium following the skateboarder as he moves. In the event that the client device is held stationary during viewing, the superimposed medium will appear to move from left to right along with the skateboarder within the augmented view of reality. However, if the client device is moved such that the view of reality stays in alignment with the camera views used to capture the medium, then the superimposed medium will appear to remain stationary within the augmented view of reality.

Once the medium has been superimposed over the view of reality in the Augmented Reality Window, a user can capture images or videos of the augmented reality using a camera feature or other optical viewer of the client device. Images or videos of the augmented reality can be captured by the user in the same manner as the user would capture an image or video of reality. The client viewer module or a separate module is configured to capture the view of reality and superimpose the medium over the view of reality to create a single image or video of an augmented reality. In this manner, the user or other individuals may step into the view of reality as seen through the Augmented Reality Window, and the resulting image or video will contain the view of reality, the user or other individuals, and the superimposed medium together. In the case where the superimposed medium is historical, the user or other individuals may appear to have traveled back in time. In the case where the superimposed medium is a future design or depiction, the user or other individuals may appear to have traveled forward in time. In this way, the Augmented Reality Platform is capable of delivering a truly unique experience for each and every user.

Figure 28:
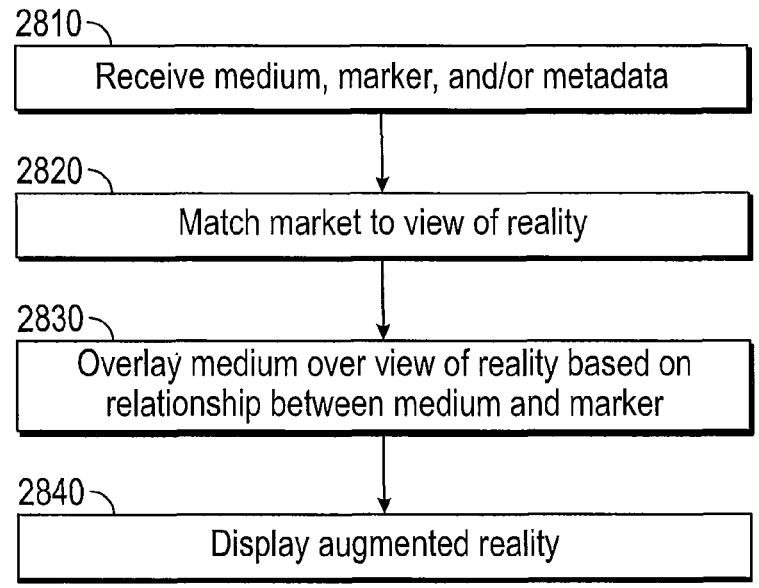
FIG. 28 is a high-level block diagram of a process for augmenting reality, according to an embodiment.

FIG. 28 illustrated a high-level block diagram of a process for augmenting a view of reality, according to an embodiment of the client viewer module. In step 2810, the desired medium, along with its marker and/or metadata is retrieved from the VM by the client viewer module executed on a client device. In step 2820, the marker is matched to a current view of reality of the client device, for example, using pattern-matching. Once the marker is matched to the view of reality, in step 2830, the medium is overlaid or superimposed over the view of reality based on the relationship of the medium and the marker. This relationship may be stored as at least a portion of the metadata. In step 2840, once the medium is overlaid over the view of reality, the augmented view of reality is displayed to the user of the client viewer module.

5. Additional Features

In an embodiment, access to the VM can be restricted such that it is only accessible through the client application. In this embodiment, there is no user interface or interaction with the VM, except via the client application or applications. For additional security, communications between the VM and client application can be encrypted, for example, using Transport Layer Security (TLS) or Secure Sockets Layer (SSL).

In an embodiment, media can be filtered to prevent or restrict uploading or viewing of indecent media. The filtering process may be performed by the VM or client application. For example the VM or client application may be configured to identify indecent photographs through pattern-matching or other algorithms. Additionally or alternatively, filtering can be performed by users of the Augmented Reality Platform. For example, the client application or VM may enable a user to flag media which the user believes is indecent. A flag value indicating whether the medium is indecent or potentially indecent can be associated with the flagged medium and stored in the VM. The flag may be a Boolean value.

The VM or client application can prevent media which has been identified as indecent from being stored in the VM. Additionally or alternatively, media which has been flagged as indecent or potentially indecent can be stored and subsequently reviewed to determine whether it should be removed from the VM. Alternatively, viewing of indecent media can be restricted to users with certain permissions and/or characteristics, e.g., users over the age of eighteen.

Figure 29:
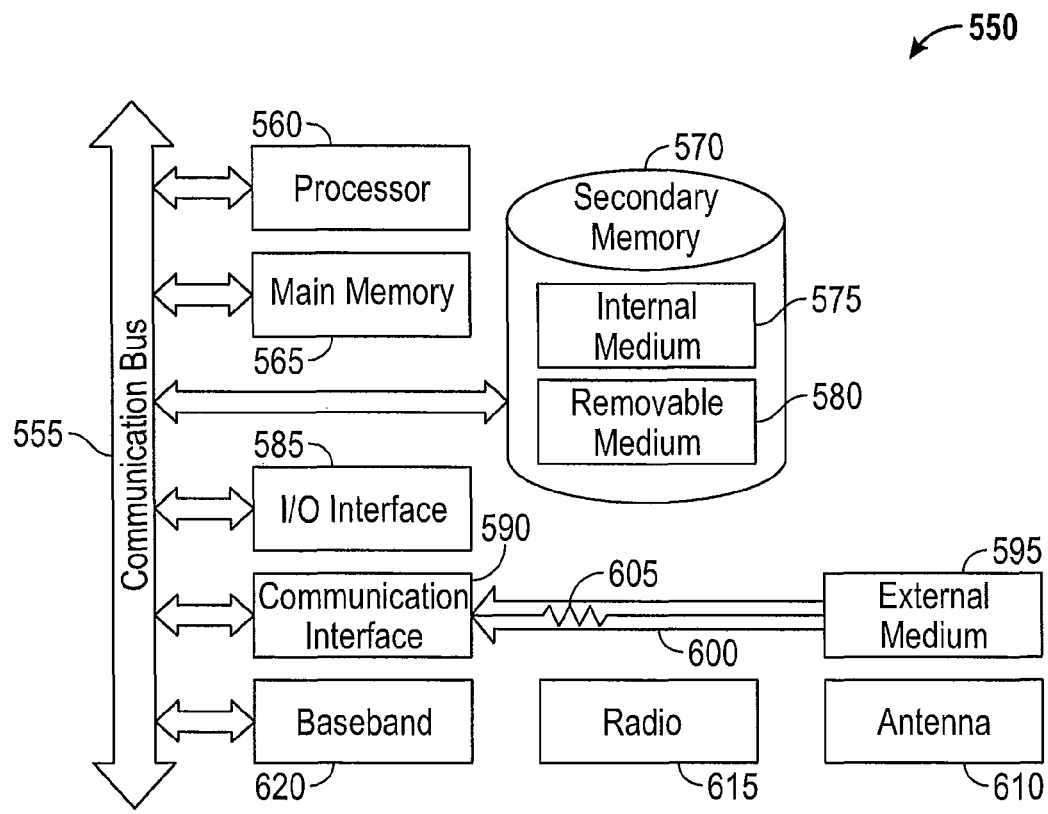
FIG. 29 illustrates a processing system on which one or more of the modules described herein may reside, according to an embodiment.

FIG. 29 is a block diagram illustrating an example wired or wireless system 550 that may be used in connection with various embodiments described herein. For example the system 550 may be used as or in conjunction with one or more of the mechanisms and processes previously described above. The system 550 can be a server or any conventional personal computer, or any other processor-enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560, such as one or more of the modules discussed above. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include a internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 570. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the system 550.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown).

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A system for augmenting a view of reality, the system comprising:
   a client perspective module stored on a client device, the client device comprising at least one processor, the client perspective module configured to, when executed by the at least one processor,
      superimpose a first medium over a first view of reality,
      receive one or more of a change in transparency of the superimposed first medium, a change in size of the superimposed first medium, and a change in position of the superimposed first medium,
      generate a first marker, the first marker comprising at least a portion of the first view of reality,
      generate first metadata related to at least one of the first medium and the first marker wherein the first metadata comprises first position data including at least one of a location and orientation of the client device at a time when the first marker was generated, and
      send the first medium, the first marker, and the first metadata to a depository; and
   a client viewer module stored on the client device, the client viewer module configured to, when executed by the at least one processor,
      receive a second medium, a second marker, and second metadata from the depository, wherein the second metadata comprises second position data including at least one of a location and orientation of a second device at a time when the second marker was generated,
      match the second marker to at least a portion of a second view of reality,
      superimpose the second medium over the at least a portion of the second view of reality to generate an augmented view of reality, and
      provide instructions to a user of the client device on how to position the client device based on the second position data.

2. The system of claim 1, wherein the second metadata comprises a location of a second device at a time when the marker was generated, and the client viewer module is further configured to automatically retrieve at least the second medium and the second marker from the depository when the client device is within a predetermined range of the location.

3. The system of claim 1, wherein the second metadata comprises a relationship between the second medium and the second marker, and wherein the client viewer module is configured to superimpose the second medium over the at least a portion of the second view of reality based on the relationship between the second medium and the second marker.

4. The system of claim 1, wherein the client viewer module is configured to match the second marker to the at least a portion of the second view of reality by matching one or more patterns in the second marker to one or more patterns in the second view of reality.

5. The system of claim 1, wherein the client viewer module is configured to match the second marker to the at least a portion of the second view of reality by matching one or more patterns in the second marker to one or more patterns in the second view of reality and matching the second position data to at least one of a location and orientation of the client device.

6. The system of claim 5, wherein the client viewer module is configured to:
   attempt to match one or more patterns in the second marker to one or more patterns in the second view of reality; and
   if it cannot match one or more patterns in the second marker to one or more patterns in the second view of reality, attempt to match the second position data to at least one of a location and orientation of the client device.

7. The system of claim 5, wherein the client viewer module is configured to attempt to match the second position data to at least one of a location and orientation of the client device by providing instructions to a user of the client device, the instructions based on the position data and the at least one of the location and orientation of the client device.

8. The system of claim 1, wherein the client viewer module is further configured to store an image of the augmented view of reality in a memory.

9. The system of claim 1, wherein generating the first marker comprises generating a high-density image using one or more omni-directional cameras, wherein the second marker comprises a high-density image, and wherein matching the second marker to at least a portion of the second view of reality comprises approximating the relative position between the client device and the second marker using inverse photogrammetry.

10. The system of claim 1, further comprising an embeddable code, wherein the embeddable code, when executed:
   superimposes the first medium over a captured portion of the first view of reality; and
   changes a transparency of the superimposed first medium in response to one or more user interactions.

11. A method for augmenting a view of reality, the method comprising, by a client device comprising at least one processor and at least one memory:
   superimposing a medium over a view of reality;
   receiving one or more of a change in transparency of the superimposed medium, a change in size of the superimposed medium, and a change in position of the superimposed medium,
   generating a marker, the marker comprising at least a portion of the view of reality;
   generating metadata related to at least one of the medium and the marker, wherein the metadata comprises position data including at least one of a location and orientation of the client device at a time when the marker was generated;
   sending the medium, the marker and the metadata to a depository, and
   instructing a user of a second client device on how to position the second client device based on the position data.

12. A method for augmenting a view of reality, the method comprising, by a client device comprising at least one processor and at least one memory:
   receiving a medium, a marker and metadata from a depository, the marker comprising at least a portion of a view of reality and the metadata comprising position data including at least one of a location and orientation of a second device at a time when the marker was generated;
   matching the marker to at least a portion of the view of reality;
   superimposing the medium over the matched at least a portion of the view of reality to generate an augmented view of reality, and
   instructing a user of the client device on how to position the client device based on the position data.

13. The method of claim 12, wherein the instructions comprise an outline of the marker.

14. The method of claim 12, wherein the metadata comprises a relationship between the medium and the marker, and wherein superimposing the medium over the matched at least a portion of the view of reality is based on the relationship between the medium and the marker.

15. The method of claim 12, further comprising, once the marker is matched to the at least a portion of the view of reality:
   generating a new marker based on the at least a portion of the view of reality; and
   matching the new marker to at least a portion of the view of reality.

16. The method of claim 12, wherein the matching comprises:
   attempting to match one or more patterns in the marker to one or more patterns in the view of reality; and
   if unable to match one or more patterns in the marker to one or more patterns in the view of reality, attempting to match the position data to at least one of a location and orientation of the client device.

17. The method of claim 16, wherein attempting to match the position data to at least one of a location and orientation of the client device comprises providing instructions to a user of the client device, the instructions based on the position data and the at least one of the location and orientation of the client device.

18. The method of claim 12, further comprising storing an image of the augmented view of reality in a memory.

* * * * *